(12) United States Patent
Jiang et al.

(10) Patent No.: US 11,592,585 B2
(45) Date of Patent: Feb. 28, 2023

(54) DETECTOR STRUCTURE IN A PET SYSTEM

(71) Applicant: SHANGHAI UNITED IMAGING HEALTHCARE CO., LTD., Shanghai (CN)

(72) Inventors: Huawei Jiang, Shanghai (CN); Huaifang Jiang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 0 days.

(21) Appl. No.: 17/659,654

(22) Filed: Apr. 18, 2022

(65) Prior Publication Data

US 2022/0244414 A1    Aug. 4, 2022

Related U.S. Application Data

(60) Continuation of application No. 16/740,433, filed on Jan. 11, 2020, now Pat. No. 11,307,316, which is a division of application No. 15/689,836, filed on Aug. 29, 2017, now Pat. No. 10,534,097.

(30) Foreign Application Priority Data

Oct. 14, 2016  (CN) .......................... 201610899083.1
Feb. 10, 2017  (CN) .......................... 201710072902.X

(51) Int. Cl.
*G01T 1/00* (2006.01)
*G01T 1/29* (2006.01)

(52) U.S. Cl.
CPC .................................. *G01T 1/2985* (2013.01)

(58) Field of Classification Search
CPC ................................................... G01T 1/2985
See application file for complete search history.

(56) References Cited

U.S. PATENT DOCUMENTS 436,798 A      9/1890  Miller
2002/0148970 A1  10/2002  Wong et al.
(Continued)

FOREIGN PATENT DOCUMENTS

CN      201643677 U    11/2010
CN      102540239 A     7/2012
(Continued)

OTHER PUBLICATIONS

First Office Action in Chinese Application No. 201610899083.1 dated Oct. 8, 2018, 17 pages.
(Continued)

*Primary Examiner* — Dani Fox
(74) *Attorney, Agent, or Firm* — Metis IP LLC

(57) ABSTRACT

The present disclosure relates to a PET detector and a PET frame. The PET detector may include a plurality of detector modules and a plurality of installing modules configured to install the plurality of detector modules. The plurality of installing modules may be coupled together to form a detector ring. The PET frame may include a detector stabilizing cylinder configured to stabilize a detector and a fixing support configured to support the detector stabilizing cylinder. The detector stabilizing cylinder may be rotatably fixed on the fixing support.

20 Claims, 18 Drawing Sheets

(56) References Cited

U.S. PATENT DOCUMENTS

| | | | |
|---|---|---|---|
| 2004/0217292 A1* | 11/2004 | Moyers | A61B 6/037 250/363.03 |
| 2013/0256537 A1 | 10/2013 | Laurence et al. | |
| 2015/0073272 A1 | 3/2015 | Corbeil | |
| 2016/0183893 A1 | 6/2016 | Zhang et al. | |

FOREIGN PATENT DOCUMENTS

| | | |
|---|---|---|
| CN | 103099638 A | 5/2013 |
| CN | 103479372 A | 1/2014 |
| CN | 104056804 A | 9/2014 |
| CN | 104367332 A | 2/2015 |
| CN | 104825181 A | 8/2015 |
| CN | 105353027 A | 2/2016 |
| WO | 2016123688 A1 | 8/2016 |

OTHER PUBLICATIONS

The Third Office Action in Chinese Application No. 201610899083.1 dated Jun. 6, 2019, 18 pages.
The Fourth Office Action in Chinese Application No. 201610899083.1 dated Jun. 3, 2021, 16 pages.
First Office Action its Chinese Application No. 201710072902.X dated Mar. 27, 2019, 15 pages.

\* cited by examiner

310

DETECTOR STRUCTURE IN A PET SYSTEM

CROSS-REFERENCE TO RELATED APPLICATIONS

This application is a continuation of U.S. application Ser. No. 16/740,433, filed on Jan. 11, 2020, which is a divisional of U.S. patent application Ser. No. 15/689,836 (now U.S. Pat. No. 10,534,097), filed on Aug. 29, 2017, which claims priority of Chinese Patent Application No. 201710072902.X filed on Feb. 10, 2017, and Chinese Patent Application No. 201610899083.1 filed on Oct. 14, 2016, the entire contents of each of which are hereby incorporated by reference.

TECHNICAL FIELD

The present disclosure generally relates to a positron emission tomography (PET) system, and more particularly, relates to a detector structure of the PET system.

BACKGROUND

Positron emission tomography (PET) is a technology that is used to observe metabolic processes in the body. The PET technology has been widely used in medical diagnosis. The PET technology may use a plurality of detector modules that form a detector ring to detect pairs of gamma rays emitted indirectly by a positron-emitting radionuclide, which is introduced into the body on a biologically active molecule. It is desirable to provide a detector structure with simplicity of installation and maintenance.

SUMMARY

In a first aspect of the present disclosure, a PET detector is provided. The PET detector may include a plurality of detector modules and a plurality of installing modules configured to install the plurality of detector modules. In some embodiments, the plurality of installing modules may be coupled together to form a detector ring.

In some embodiments, at least one of the plurality of installing modules may include a chain piece, and the chain piece may further include an installing groove on a surface connected to one of the plurality of detector modules. In some embodiments, the one of plurality of detector modules may further include a sliding part corresponding to the installing groove. In some embodiments, the sliding part may be installed in the installing groove.

In some embodiments, the plurality of installing modules may include a first chain piece and a second chain piece. In some embodiments, the first chain piece and the second chain piece may be adjacent. In some embodiments, each of the first chain piece and the second chain piece may include a convex part at one end along a circumferential direction of the detector ring and a recessed part at the other end along the circumferential direction of the detector ring. In some embodiments, the convex part of the first chain piece may be coupled to the recessed part of the second chain piece via a rotation axis.

In some embodiments, the second chain piece may further include a position-limiting surface on one end of the second chain piece adjacent to the first chain piece. In some embodiments, the position-limiting surface may be configured to determine an angle formed by the first chain piece and the second chain piece.

In some embodiments, the plurality of installing modules may include a first chain piece and a second chain piece. In some embodiments, the first chain piece and the second chain piece may be adjacent. In some embodiments, each of the first chain piece and the second chain piece may include two hinge parts on both ends along a circumferential direction of the detector ring and a rotation axis corresponding to each of the two hinge parts. In some embodiments, the first chain piece and the second chain piece may be coupled together by the respective hinge parts and the rotation axis.

In some embodiments, the rotation axis may be located at a position of the hinge part close to the center of the detector ring.

In some embodiments, the PET detector may further include a connection part configured to connect the first chain piece and the second chain piece.

In some embodiments, each of the first chain piece and the second chain piece may further include a stabilizing plate, and the connection part may be configured to connect the stabilizing plates of the first chain piece and the second chain piece.

In some embodiments, the PET detector may include at least two detector rings formed by the plurality of detector modules and the plurality of installing modules. In some embodiments, the at least two detector rings may be arranged parallel to an axial direction of the at least two detector rings.

In a second aspect of the present disclosure, another PET detector is provided. The PET detector may include a plurality of detector modules and a plurality of installing modules configured to install the plurality of detector modules. In some embodiments, the plurality of installing modules may be sequentially connected to form a detachable ring structure. In some embodiments, the detachable ring structure may include an outer circumference surface and an inner circumference surface spaced apart along a radial direction of the detachable ring structure. In some embodiments, the plurality of detector modules may be continuously arranged along the inner circumference surface of the detachable ring structure.

In a third aspect of the present disclosure, a PET frame is provided. The PET frame may include a detector stabilizing cylinder configured to stabilize one or more detector modules and a fixing support configured to support the detector stabilizing cylinder. In some embodiments, the detector stabilizing cylinder may be rotatably fixed on the fixing support.

In some embodiments, the fixing support may be configured to fix the detector stabilizing cylinder through a rolling wheel.

In some embodiments, the fixing support may include a front fixing support and a rear fixing support. In some embodiments, the rolling wheel may be fixed between the front fixing support and the rear fixing support by a scrollable axis.

In some embodiments, the rolling wheel may include at least two rolling wheels. The two rolling wheels may be located on both sides of a vertical center line of the detector stabilizing cylinder, respectively, and be beneath a horizontal center line of the detector stabilizing cylinder.

In some embodiments, the rolling wheel may include at least one drive wheel configured to drive the detector stabilizing cylinder to rotate on the fixing support.

In some embodiments, the rolling wheel may include an axial position-limiting wheel configured to limit an axial position of the detector stabilizing cylinder and a radial position-limiting wheel configured to limit a radial position of the detector stabilizing cylinder.

In some embodiments, the rolling wheel may include at least one axial position-limiting wheel and at least two radial position-limiting wheels.

In some embodiments, the at least one axial rolling wheel and the at least two radial position-limiting wheels may be uniformly distributed along a circumferential direction of the detector stabilizing cylinder.

In some embodiments, the rolling wheel may include four axial position-limiting wheels and four radial position-limiting wheels.

In some embodiments, the PET frame may further include a brake part configured to immobilize the detector stabilizing cylinder.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular exemplary embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," and/or "module" used herein are one method to distinguish different components, elements, parts, section or assembly of different level in ascending order. However, the terms may be displaced by other expression if they achieve the same purpose.

It will be understood that when a unit, engine or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

Figure 1:
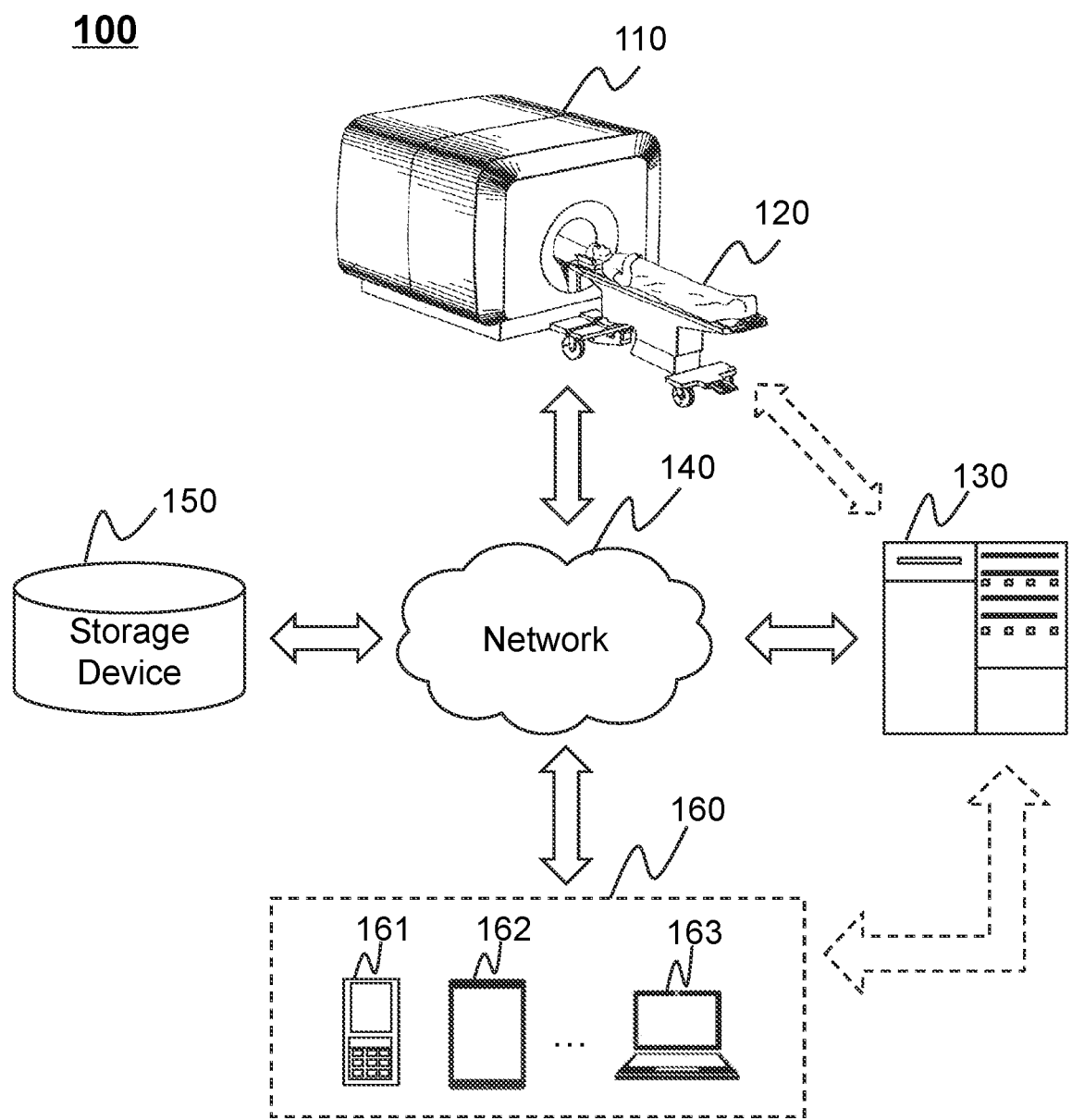
FIG. 1 is a block diagram illustrating an exemplary imaging system according to some embodiments of the present disclosure.

FIG. 1 is a block diagram illustrating an exemplary imaging system 100 according to some embodiments of the present disclosure. The imaging system 100 may be a single modality imaging system including, for example, a digital subtraction angiography (DSA) system, a magnetic resonance imaging (MRI) system, a computed tomography angiography (CTA) system, a positron emission tomography (PET) system, a single photon emission computed tomography (SPECT) system, a computed tomography (CT) system, a digital radiography (DR) system, etc. In some embodiments, the imaging system 100 may be a multi-modality imaging system including, for example, a positron emission tomography-computed tomography (PET-CT) system, a positron emission tomography-magnetic resonance imaging (PET-MRI) system, a single photon emission computed tomography-positron emission tomography (SPECT-PET) system, a digital subtraction angiography-magnetic resonance imaging (DSA-MRI) system, etc. For better understanding the present disclosure, a PET system may be described as an example of the imaging system 100. It should be noted that the imaging system 100 described below is merely provided for illustration purposes, and not intended to limit the scope of the present disclosure.

As shown in FIG. 1, the imaging system 100 may include a PET scanner 110, an examining table 120, a processing engine 130, a network 140, a storage device 150, and one or more terminal devices 160. In some embodiments, the PET scanner 110, the examining table 120, the processing engine 130, the storage device 150, and/or the terminal device 160 may be connected to and/or communicate with each other via a wireless connection (e.g., the network 140), a wired connection, or any combination thereof.

The PET scanner 110 may generate a medical image or provide image data based on PET signals via scanning a subject, or part of the subject. In some embodiments, the PET scanner 110 may include a detector that may capture the PET signals relating to the subject. In some embodiments, the PET signals may be electrical signals. The electrical signals may correspond to an event when a photon is detected by a photovoltaic device. The PET scanner 110 will be discussed in detail in connection with FIG. 2.

In some embodiments, the subject may include a body, a substance, an object, or the like, or any combination thereof. In some embodiments, the subject may be a specific portion of a body, a specific organ, or a specific tissue, such as head, brain, neck, body, shoulder, arm, thorax, cardiac, stomach, blood vessel, soft tissue, knee, feet, or the like, or any combination thereof. In some embodiments, the PET scanner 110 may transmit the image data via the network 140 to the processing engine 130, the storage device 150, and/or the terminal device 160. For example, the image data may be sent to the processing engine 130 for further processing, or may be stored in the storage device 150.

The processing engine 130 may process data and/or information obtained from the PET scanner 110, the storage device 150, and/or the terminal device 160. For example, the processing engine 130 may process the image data and determine a PET image based on the image data. As another example, the processing engine 130 may determine one or more imaging parameters (e.g., imaging radiation dose) based on a scanning protocol. In some embodiments, the processing engine 130 may be a single server or a server group. The server group may be centralized or distributed. In some embodiments, the processing engine 130 may be local or remote. For example, the processing engine 130 may access information and/or data from the PET scanner 110, the storage device 150, and/or the terminal device 160 via the network 140. As another example, the processing engine 130 may be directly connected to the PET scanner 110, the terminal device 160, and/or the storage device 150 to access information and/or data. In some embodiments, the processing engine 130 may be implemented on a cloud platform. For example, the cloud platform may include a private cloud, a public cloud, a hybrid cloud, a community cloud, a distributed cloud, an inter-cloud, a multi-cloud, or the like, or any combination thereof.

The network 140 may include any suitable network that can facilitate exchange of information and/or data for the imaging system 100. In some embodiments, one or more components of the imaging system 100 (e.g., the PET scanner 110, the examining table 120, the processing engine 130, the storage device 150, or the terminal device 160) may communicate information and/or data with one or more other components of the imaging system 100 via the network 140. For example, the processing engine 130 may obtain image data from the PET scanner 110 via the network 140. As another example, the processing engine 130 may obtain user instructions from the terminal device 160 via the network 140. The network 140 may include a public network (e.g., the Internet), a private network (e.g., a local area network (LAN), a wide area network (WAN)), etc.), a wired network (e.g., an Ethernet network), a wireless network (e.g., an 802.11 network, or a Wi-Fi network), a cellular network (e.g., a Long Term Evolution (LTE) network), a frame relay network, a virtual private network ("VPN"), a satellite network, a telephone network, routers, hubs, switches, server computers, or the like, or any combination thereof. For example, the network 140 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points such as base stations and/or internet exchange points through which one or more components of the imaging system 100 may be connected to the network 140 to exchange data and/or information.

The storage device 150 may store data, instructions, and/or any other information. In some embodiments, the storage device 150 may store data obtained from the processing engine 130 and/or the terminal device 160. In some embodiments, the storage device 150 may store data and/or instructions that the processing engine 130 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be implemented on a cloud platform as described elsewhere in the disclosure.

In some embodiments, the storage device 150 may be connected to the network 140 to communicate with one or more other components in the imaging system 100 (e.g., the processing engine 130, or the terminal device 160). One or more components in the imaging system 100 may access the data or instructions stored in the storage device 150 via the network 140. In some embodiments, the storage device 150 may be part of the processing engine 130.

The terminal device 160 may be connected to and/or communicate with the PET scanner 110, the examining table 120, the processing engine 130, and/or the storage device 150. For example, the processing engine 130 may acquire a scanning protocol from the terminal device 160. As another example, the terminal device 160 may obtain image data from the PET scanner 110 and/or the storage device 150. In some embodiments, the terminal device 160 may include a mobile device 161, a tablet computer 162, a laptop computer 163, or the like, or any combination thereof. In some embodiments, the mobile device 161 may include a mobile phone, a personal digital assistance (PDA), a gaming device, a navigation device, a point of sale (POS) device, a laptop, a tablet computer, a desktop, or the like, or any combination thereof. In some embodiments, the terminal device 160 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 130 via, for example, a bus, for further processing. Other types of the input device may include a cursor control device, such as a mouse, a trackball, or cursor direction keys, etc. The output device may include a display, a speaker, a printer, or the like, or any combination thereof. In some embodiments, the external device 140 may be part of the processing engine 130.

This description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. For example, the storage device 150 may be a data storage including cloud computing platforms, such as, public cloud, private cloud, community, hybrid clouds, etc. In some embodiments, the processing engine 130 may be integrated into the PET scanner 110. However, those variations and modifications do not depart the scope of the present disclosure.

Figure 2:
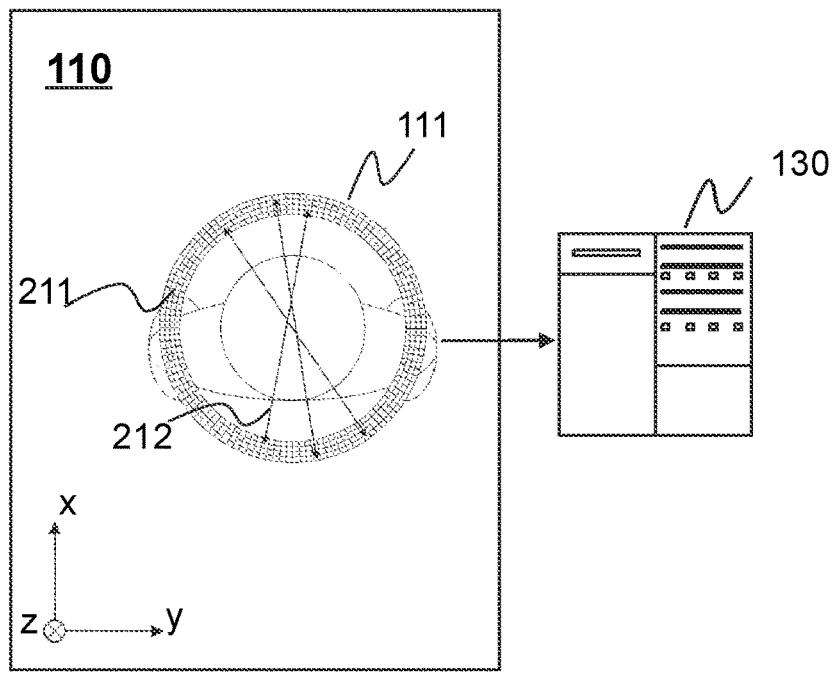
FIG. 2 is a block diagram illustrating an exemplary PET scanner according to some embodiments of the present disclosure.

FIG. 2 is a block diagram illustrating an exemplary PET scanner 110 according to some embodiments of the present disclosure. The PET scanner 110 may include a detector 111 for detecting PET signals associated with lines of response 212.

As shown in FIG. 2, the detector 111 may include a plurality of detector modules 211. The plurality of detector modules 211 may be arranged in the form of a ring, a cylinder, a portion thereof, to surround the subject being scanned. In some embodiments, the detector 111 may include a plurality of detector rings. In some embodiments, the plurality of detector modules 211 may be placed within the wall of the PET scanner 110. In some embodiments, a plurality of detector module 211 may detect gamma rays. A patient injected with radiopharmaceuticals may lie on a bed (e.g., the examining table 120) parallel to the z axis of the PET scanner 110. The radiopharmaceuticals may include radioisotopes that decay and emit gamma rays of characteristic energy. The gamma ray photons may be generated in an electron-positron annihilation event and propagate in opposite directions. For example, two gamma ray photons may travel in opposite directions and detected by a couple of opposite detector modules 211.

When the annihilation events occur within the PET scanner 110, they may be detected as a coincidence event if both gamma ray photons strike detector modules 211 substantially simultaneously. In order to validate a coincidence event, the processing engine 130 may detect the time information of electrical pulses from the detector 111 when incident gamma ray photons are detected.

As used herein, a line of response (LOR) may be determined by connecting the couple of detector modules 211 of a coincidence event and the annihilation point may be determined based on the time information of the two single events. It should also be noted here that the "line of response" or "LOR" used herein may be representative of a radiation ray, and not intended to limit the scope of the present disclosure. The radiation ray used herein may include a particle ray, a photon ray, etc. The particle ray may include particles such as, a neutron, a proton, an electron, a p-meson, a heavy ion, or the like, or any combination thereof. For example, the radiation ray may represent the intensity of an X-ray beam passing through the subject in the case of a CT system. As another example, the radiation ray may represent the probability of a positron generated in the case of a PET system.

Figure 3:
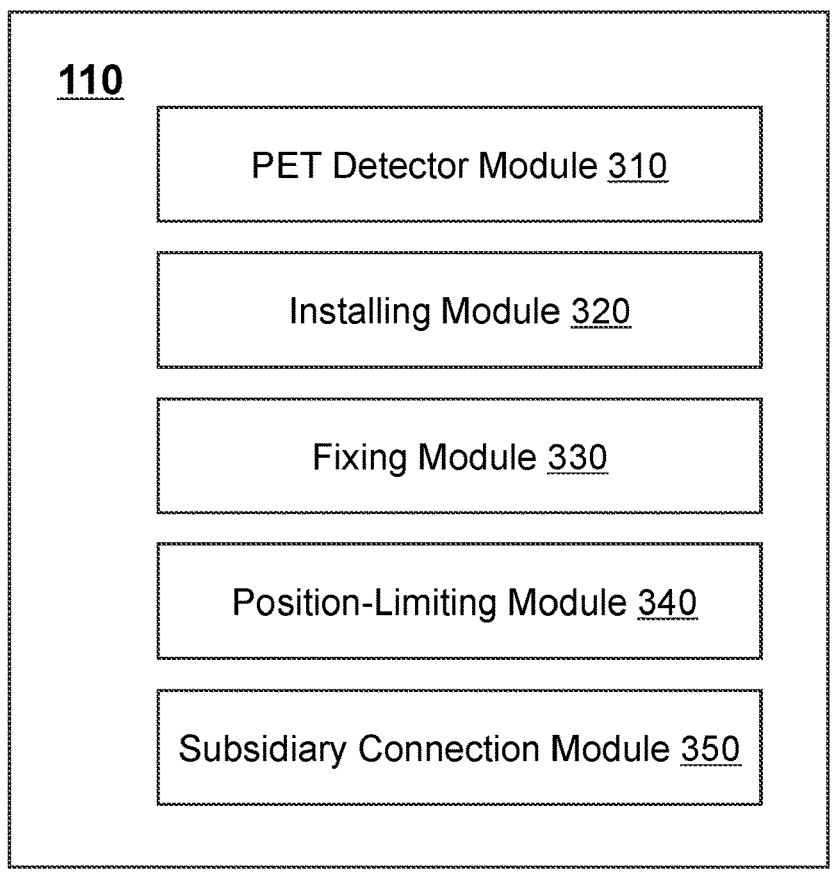
FIG. 3 is a block diagram illustrating an exemplary PET scanner according to some embodiments of the present disclosure.

FIG. 3 is a block diagram illustrating an exemplary PET scanner 110 according to some embodiments of the present disclosure. As shown in FIG. 3, the PET scanner 110 may include a PET detector module 310, an installing module 320, a fixing module 330, a position-limiting module 340, and a subsidiary connection module 350.

The PET detector module 310 may be configured to detect gamma rays. The PET detector module 310 may be the detector module 211 in FIG. 2. The detector module and the PET detector module may be used interchangeably in the present disclosure.

The installing module 320 may be configured to install the PET detector module 310. In some embodiments, the PET detector module 310 may be installed at a part of the installing module 320 (e.g., a surface of the installing module 320). The PET detector module 310 may be installed at the part of the installing module 320 through different installation manners including, for example, gluing, welding, riveting, pressing, casting, pinning, buttoning, tying, sticking, clasping, plugging, screw connection, or the like, or any combination thereof. For example, the PET detector module 310 may be connected with the installing module 320 by a screw. In some embodiments, the installing module 320 may include one or more small parts (e.g., a connection plate, or an axle hole). The one or more small parts may facilitate connections between two or more installing modules 320. For example, a plurality of installing modules 320 that install a plurality of PET detector modules 310 thereon may be connected with each other and form a detector ring. In some embodiments, the installing module 320 may include a chain piece. Detailed description of the chain piece may be found elsewhere in the present disclosure (e.g., in the description of FIG. 4, FIG. 8, FIG. 9, or FIG. 11).

In some embodiments, the PET scanner 110 may include a detector. The detector may include a plurality of PET detector modules 310 and a plurality of installing modules 320 configured to install the plurality of PET detector modules 310. The plurality of installing modules 320 may be sequentially connected to form a ring structure. The plurality of installing modules 320 may be connected together through different connection manners including, for example, gluing, welding, riveting, pressing, casting, pinning, buttoning, tying, sticking, clasping, plugging, screw connection, or the like, or any combination thereof. The ring structure may be a detachable and modular ring structure. The ring structure may include an outer circumference surface and inner circumference surface spaced apart along the radial direction of the ring structure. The plurality of PET detector modules 310 may be continuously arranged along the inner circumference surface of the ring structure. For example, the plurality of PET detector modules 310 may be fixed with the ring structure by one or more screws.

The fixing module 330 may be configured to fix the PET detector module 310 and/or the installing module 320. For example, a plurality of PET detector modules 310 and a plurality of installing modules 320 may form a detector. The fixing module 330 may include a detector stabilizing cylinder configured to fix the detector. The detector may be fixed with the detector stabilizing cylinder through different connection manners including, for example, gluing, welding, riveting, pressing, casting, pinning, buttoning, tying, sticking, clasping, plugging, screw connection, or the like, or any combination thereof. The fixing module 330 may also include a fixing support configured to limit the detector stabilizing cylinder. In some embodiments, the detector stabilizing cylinder may be rotatably limited on the fixing support. The movements of the detector stabilizing cylinder along the axial direction and the radial direction may be limited. In some embodiments, the fixing support may limit the movements of the detector stabilizing cylinder by one or more limiting parts (e.g., the position-limiting module 340). The fixing support may include one or more supporting feet and supporting rings. In some embodiments, the fixing support may include two separate fixing supports (e.g., a front fixing support and a rear fixing support). Detailed description of the detector stabilizing cylinder and the fixing support may be found elsewhere in the present disclosure (e.g., in the description of FIG. 14, FIG. 15, or FIG. 16).

The position-limiting module 340 may be configured to facilitate the limiting operations of the fixing module 330. For example, the fixing support may limit the detector stabilizing cylinder through the position-limiting module 340. In some embodiments, the position-limiting module 340 may include a rolling wheel, a gear wheel, or the like, or any combination thereof. The rolling wheel may include an axial position-limiting wheel configured to limit the axial position of the detector stabilizing cylinder and a radial position-limiting wheel configured to limit the radial position of the detector stabilizing cylinder. The rolling wheel may be fixed between a front fixing support and a rear fixing support by a scrollable axis. In some embodiments, the rolling wheel may be a drive wheel that drives the detector stabilizing cylinder to rotate on the fixing support. In some embodiments, one or more rolling wheels may be distributed along the circumferential direction of the detector stabilizing cylinder. The number and distribution pattern of the rolling wheels may not be limiting. Detailed description of the rolling wheel may be found elsewhere in the present disclosure (e.g., in the description of FIG. 15, FIG. 16, or FIG. 17).

The subsidiary connection module 350 may be configured to facilitate operations of the PET detector module 310, the installing module 320, the fixing module 330, and/or the position-limiting module 340. The subsidiary connection module 350 may include a rotation axis, a brake part, a connection part, a scrollable axis, or the like, or any combination thereof. In some embodiments, the rotation axis may be used to connect a plurality of chain pieces. In some embodiments, the brake part may be used to immobilize the detector stabilizing cylinder. In some embodiments, the connection part may be used to connect two neighboring chain pieces. In some embodiments, the scrollable axis may be used to fix a rolling wheel between the front fixing support and the rear fixing support.

This description above is merely intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. For example, the PET scanner 110 may include a shielding enclosure surrounding the detector for shielding radiations. However, those variations and modifications do not depart the scope of the present disclosure.

Figure 4:
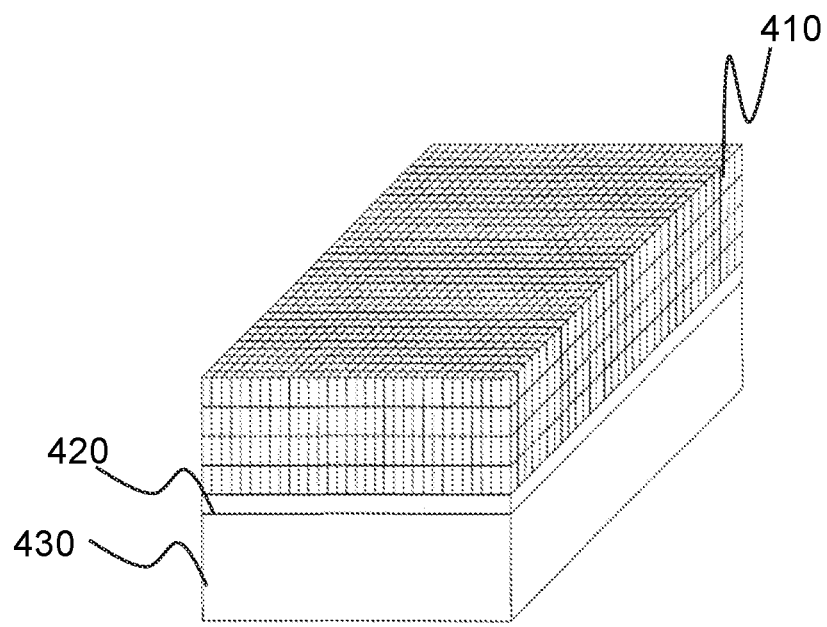
FIG. 4 is a schematic diagram illustrating an exemplary PET detector module according to some embodiments of the present disclosure.

FIG. 4 is schematic diagram illustrating an exemplary PET detector module 310 according to some embodiments of the present disclosure. The PET detector module 310 may include a scintillator 410, a light guide 420, and a photodetector 430. The light guide 420 may be optically coupled to the scintillator 410 to provide a light path to the photodetector 430. In some embodiments, the photodetector 430 may be a photomultiplier (PMT).

In some embodiments, the scintillator 410 may include an array of scintillation crystals, and the detector module 310 may include more than one photodetector. Incident gamma rays may strike the scintillator 410 to produce small bursts of visible or invisible light. The visible or invisible light may be converted to one or more electric signals (e.g., one or more electric pulses) by, for example, a photocathode of the PMT. In some embodiments, the electric pulses may be generated by amplifying electrons excited by the visible or invisible light through a dynode string in the PMT.

The scintillator 410 may include different kinds of compounds. Exemplary compounds may include Bismuth germinate (BGO), barium fluoride (BaFl), gadolinium silicate (GSO), Lutetium orthosilicate (LSO), Lutetium Yttrium orthosilicate (LYSO), or the like, or any combination thereof.

It should be noted that the photodetector 430 may be but not limited to the PMT. In some embodiments, the photodetector 430 may be a silicon photomultiplier (SiPM), an avalanche photodiode (APD), or the like, or any combination thereof. Actually, any kind of sensor functioning as photovoltaic conversion may be suitable in the present disclosure.

Figure 5:
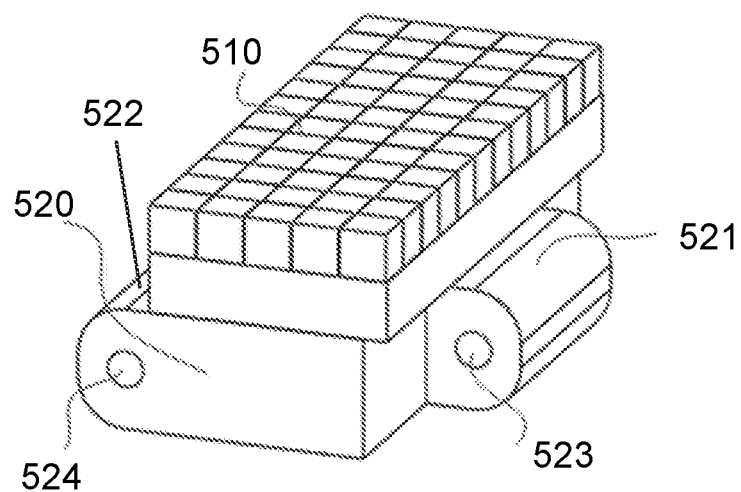
FIG. 5 illustrates an exemplary PET detector assembly according to some embodiments of the present disclosure.

FIG. 5 illustrates an exemplary PET detector assembly 500 according to some embodiments of the present disclosure. The PET detector assembly 500 may include a PET detector module 510 and a chain piece 520. The PET detector module 510 may detect incident gamma rays and generate one or more electrical signals (e.g., one or more electric pulses). The processing engine 130 may receive the electrical signals and determine a PET image based on the electrical signal. The PET detector module 510 may be the PET detector module 310 in FIG. 3. The surface of the PET detector module 510 away from the chain piece 520 may be flat or curved. The chain piece 520 may be configured to install the PET detector module 510. The PET detector module 510 may be installed on one side of the chain piece 520 through different connection manners including, for example, gluing, welding, riveting, pressing, casting, pinning, buttoning, tying, sticking, clasping, plugging, screw connection, or the like, or any combination thereof.

As shown in FIG. 5, the chain piece 520 may include a convex part 521, a recessed part 522, an axle hole 523 inside the convex part 521, and an axle hole 524 inside the recessed part 522. The convex part 521 may be formed on one end face of the chain piece 520, and the recessed part 522 may be formed on the other end face of the chain piece 520. In some embodiments, the positions of the convex part 521 and the recessed part 522 may be exchanged.

Figure 6:
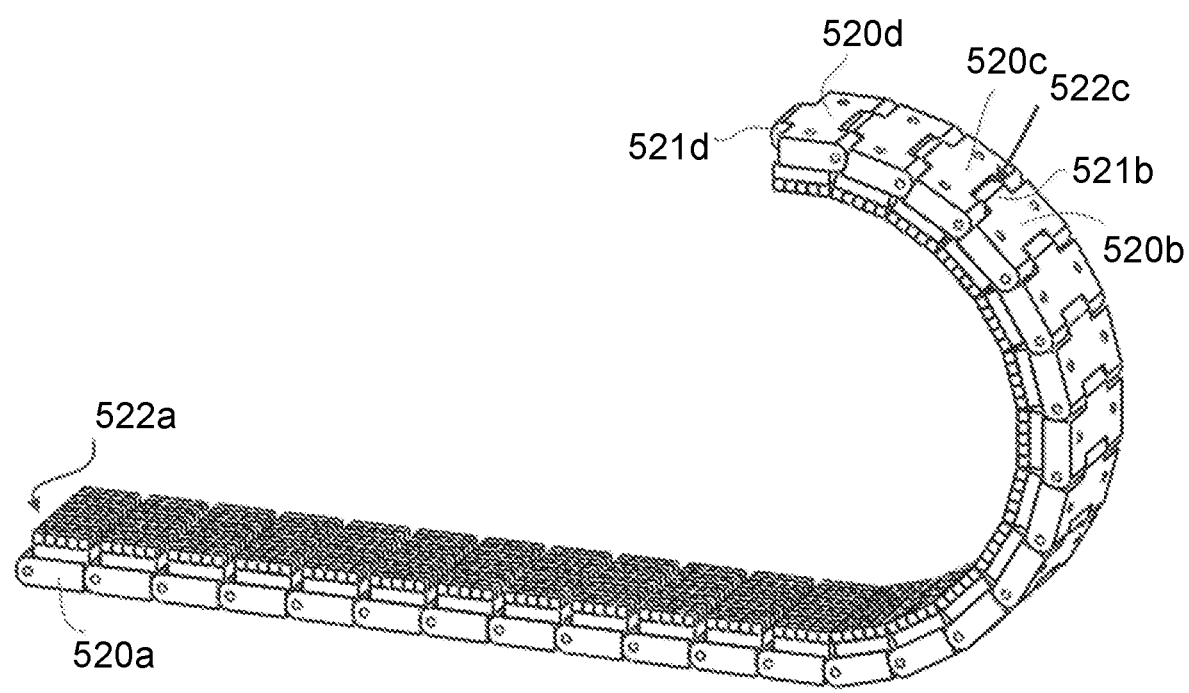
FIG. 6 illustrates an exemplary connection manner of a plurality of PET detector assemblies according to some embodiments of the present disclosure.

FIG. 6 illustrates an exemplary connection manner of a plurality of PET detector assemblies 500 according to some embodiments of the present disclosure. A plurality of PET detector assemblies 500 may be connected together end-to-end. The plurality of PET detector assemblies 500 may be arranged in the form of a ring, a cylinder, a portion thereof, etc. The number of the plurality of detector assemblies 500 may be N. Where N may be any integer, for example, 5, 10, 20, 40, etc. As shown in FIG. 6, two neighboring PET detector assemblies 500 may be hinged together through a convex part (e.g., a convex part 521d) and a recessed part (e.g., a recessed part 522a). Merely by way of example, if a chain piece 520a is the first chain piece and a chain piece 520d is the second chain piece (e.g., the Nth chain piece), the convex part 521d of the chain piece 520d may be coupled to the recessed part 522a of the chain piece 520a. The chain piece 520d and the chain piece 520a may be hinged together by a rotation axis (not shown in FIG. 6) which is through the axle hole 523 (as shown in FIG. 5) of the convex part 521d and the axle hole 524 (as shown in FIG. 5) of the recessed part 522a. Connection manners between a chain piece 520b and a chain piece 520c may be similar to that of the chain piece 520a and the chain piece 520d, and is not repeated here.

Figure 7:
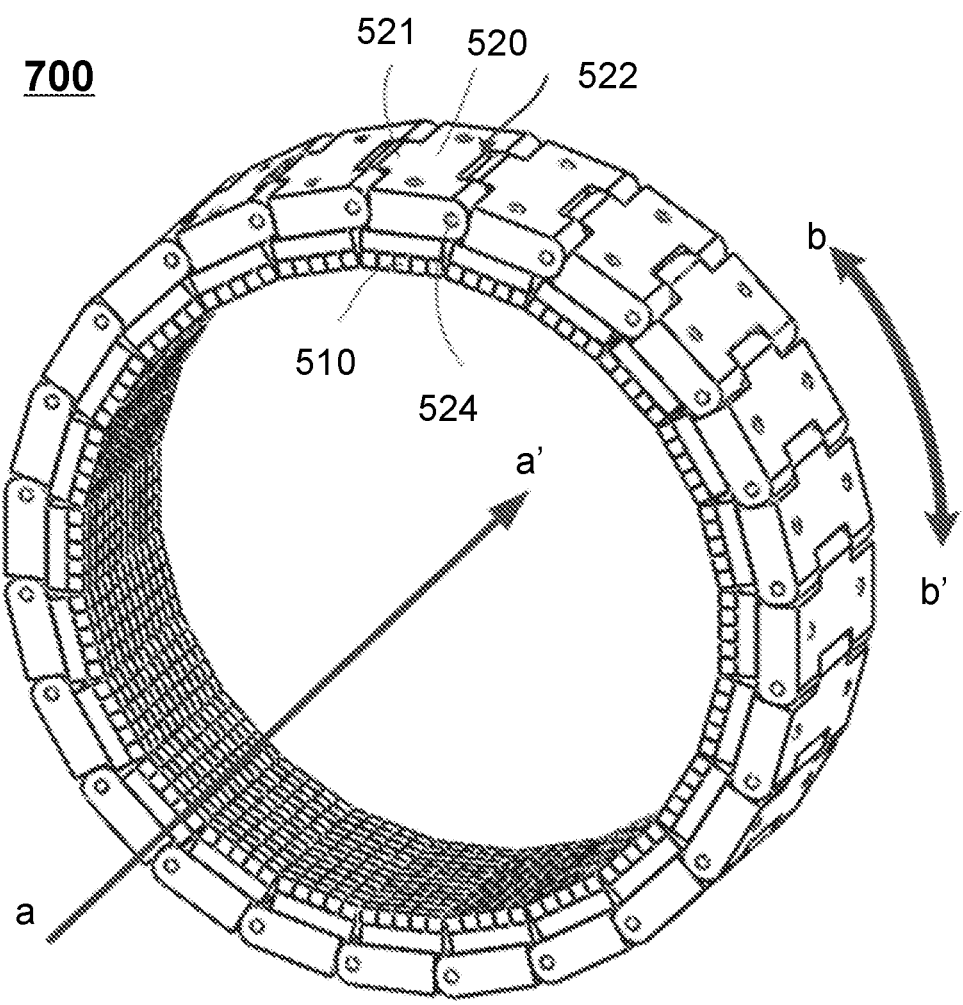
FIG. 7 illustrates an exemplary detector ring according to some embodiments of the present disclosure.

FIG. 7 illustrates an exemplary detector ring 700 according to some embodiments of the present disclosure. As shown in FIG. 7, the detector ring 700 may include a plurality of PET detector assemblies 500. Chain pieces of the plurality of PET detector assemblies 500 may be hinged together end-to-end to connect the plurality of PET detector assemblies 500 to form the detector ring 700. A direction a-a' may represent the axial direction of the detector ring 700, and a direction b-b' may represent the circumferential direction of the detector ring 700. The plurality of PET detector assemblies 500 may be arranged along the direction b-b'. The convex part 521 and the recessed part 522 of the PET detector assembly 500 may be configured on both ends of the PET detector assembly 500 along the direction b-b'.

Figure 8:
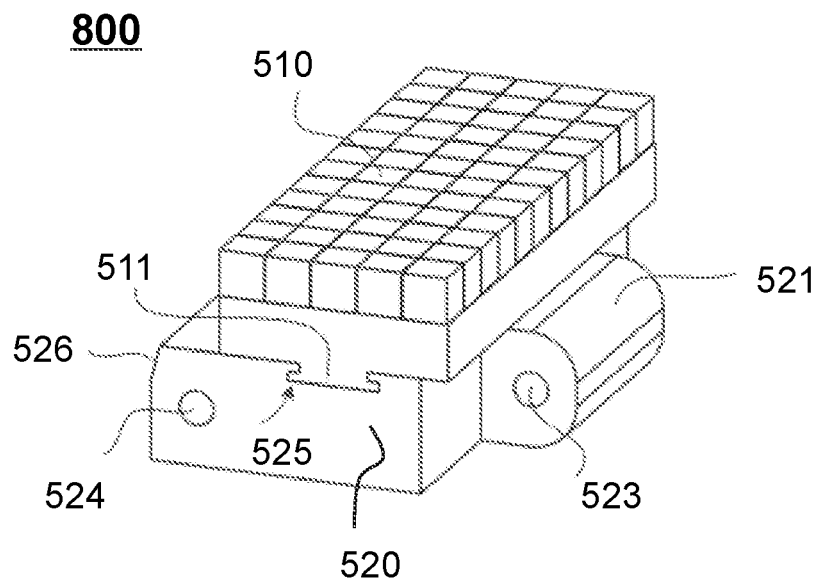
FIG. 8 illustrates an exemplary PET detector assembly according to some embodiments of the present disclosure.

FIG. 8 illustrates an exemplary PET detector assembly 800 according to some embodiments of the present disclosure. The PET detector assembly 800 may include a PET detector module 510 and a chain piece 520. The PET detector module 510 may detect incident gamma rays and generate one or more electrical signals (e.g., one or more electric pulses). The processing engine 130 may receive the electrical signals and determine a PET image based on the electrical signals. The PET detector module 510 may be the PET detector module 310 in FIG. 3. The surface of the PET detector module 510 away from the chain piece 520 may be flat or curved. The chain piece 520 may be configured to install the PET detector module 510. As shown in FIG. 8, the PET detector module 510 may include a sliding part 511. The chain piece 520 may include a convex part 521, a recessed part 522, an axle hole 523 in the convex part 521, an axle hole 524 in the recessed part 522, an installing groove 525, and a position-limiting surface 526. When connecting the PET detector module 510 with the chain piece 520, the sliding part 511 may be pushed into the installing groove 525. In some embodiments, the position of the installing groove 525 and the sliding part 511 may be interchanged. For example, the installing groove 525 may be configured on the PET detector module 510 and the sliding part 511 may be configured on the chain piece 520. The orientation of the installing groove 525 may be various. Any orientation that enables the sliding connection between the PET detector module 510 and the chain piece 520 may be suitable. In some embodiments, the shapes of the installing groove 525 and the sliding part 511 may be completely matched or fitted. The PET detector module 510 and the chain piece 520 may be further fixed through a screw connection, gluing, etc. The position-limiting surface 526 may be located on one end face of the chain piece 520, for example, on the end face away from the convex part 521. The position-limiting surface 526 may be an inclined surface. Functions of the position-limiting surface 526 will be discussed in detail in connection with FIG. 9.

Figure 9:
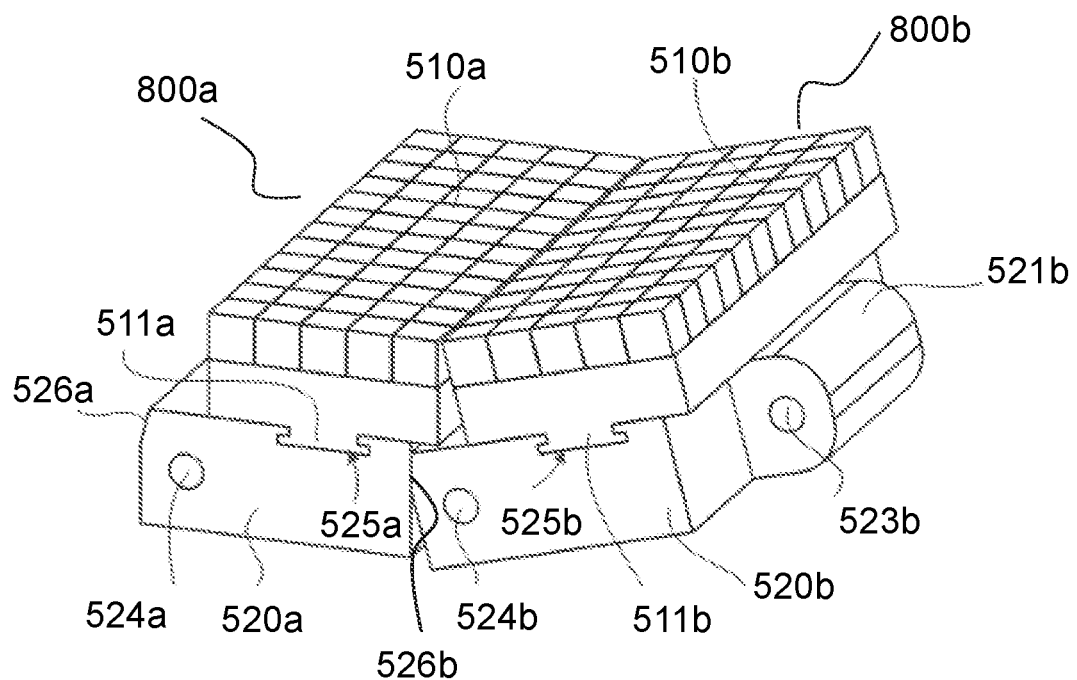
FIG. 9 illustrates an exemplary connection manner of two PET detector assemblies according to some embodiments of the present disclosure.

FIG. 9 illustrates an exemplary connection manner of two PET detector assemblies 800 according to some embodiments of the present disclosure. A PET detector assembly 800a and a detector assembly 800b may be hinged together end-to-end. The detector assembly 800a may include a PET detector module 510a and a first chain piece 520a. The detector assembly 800b may include a PET detector module 510b and a second chain piece 520b. The hinged detector assembly 800a and the detector assembly 800b may rotate around a rotation axle (not shown in FIG. 9) through an axle hole 524b and form an angle. A position-limiting surface 526b may be located on one end face of the second chain piece 520b away from the convex part 521b. The position-limiting surface 526b may be configured to push against an adjacent face of the first chain piece 520a during the rotation. The angle between the first chain piece 520a and the second chain piece 520b may be limited by the position-limiting surface 526b. The angle may be limited to avoid a collision between the PET detector module 510a and the PET detector module 510b during the rotation.

Figure 10:
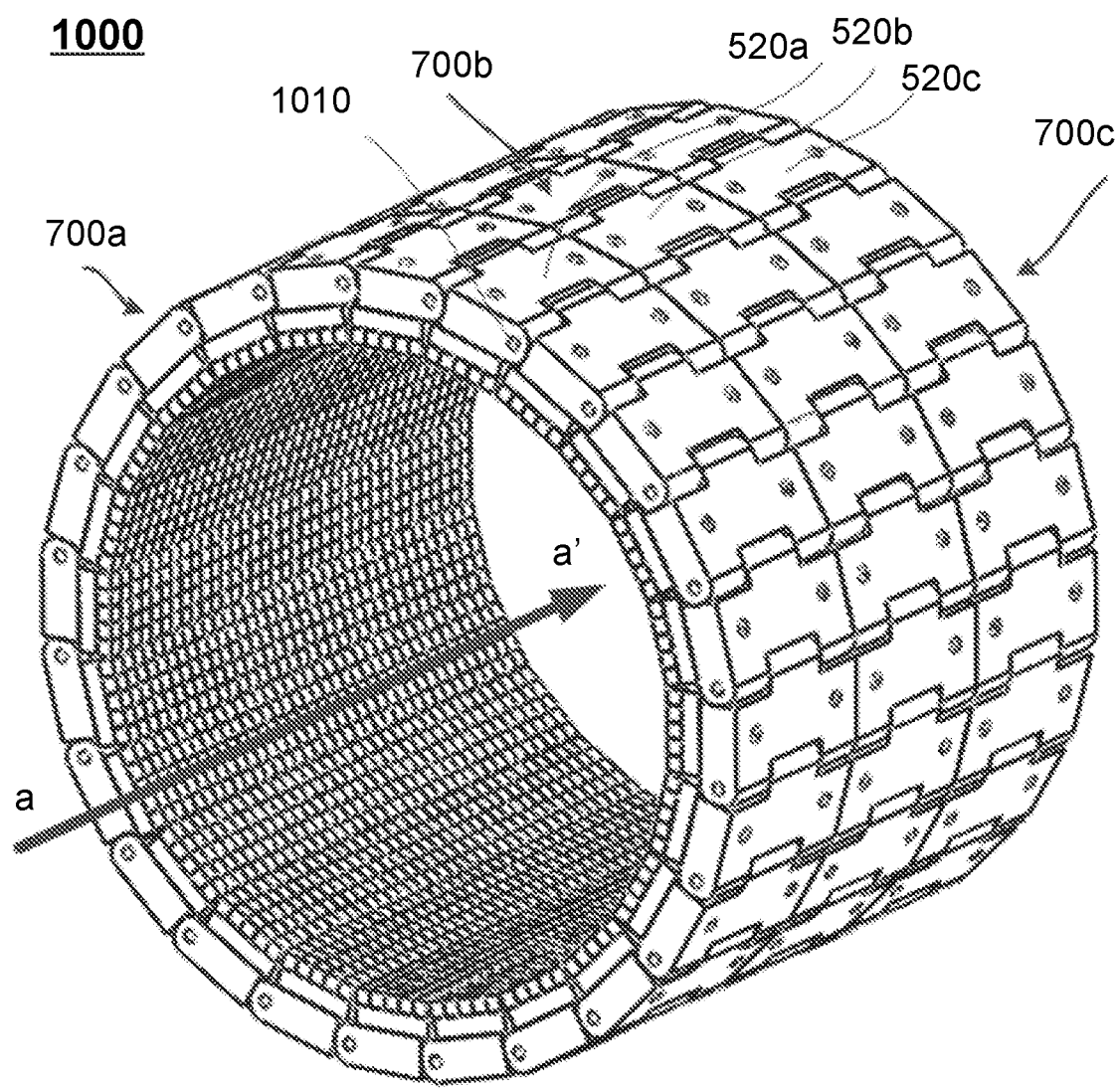
FIG. 10 illustrates an exemplary detector ring according to some embodiments of the present disclosure.

FIG. 10 illustrates an exemplary detector ring 1000 according to some embodiments of the present disclosure. In some embodiments, the detector ring 1000 may include a detector ring 700a, a detector ring 700b, and a detector ring 700c. The detector ring 700a, the detector ring 700b, and the detector ring 700c may be arranged along the axial direction a-a' of the detector ring 1000. The detector ring 700a, the detector ring 700b, and the detector ring 700c may be connected by a plurality of rotation axes. For example, a chain piece 520a, a chain piece 520b, and a chain piece 520c along a same axial direction may be connected by a rotation axis 1010.

It should be noted that the detector ring 1000 may be not limited to the detector rings 700a, 700b, and 700c. In some embodiments, the detector ring 1000 may include at least two detector rings 700. In some embodiments, to improve the imaging efficiency of the imaging system 100, the length of the detector ring 1000 along a-a' direction may be large, for example, two meters. More detector rings 700 may be connected, with increase of the length of the detector ring 1000 along a-a' direction.

Figure 11:
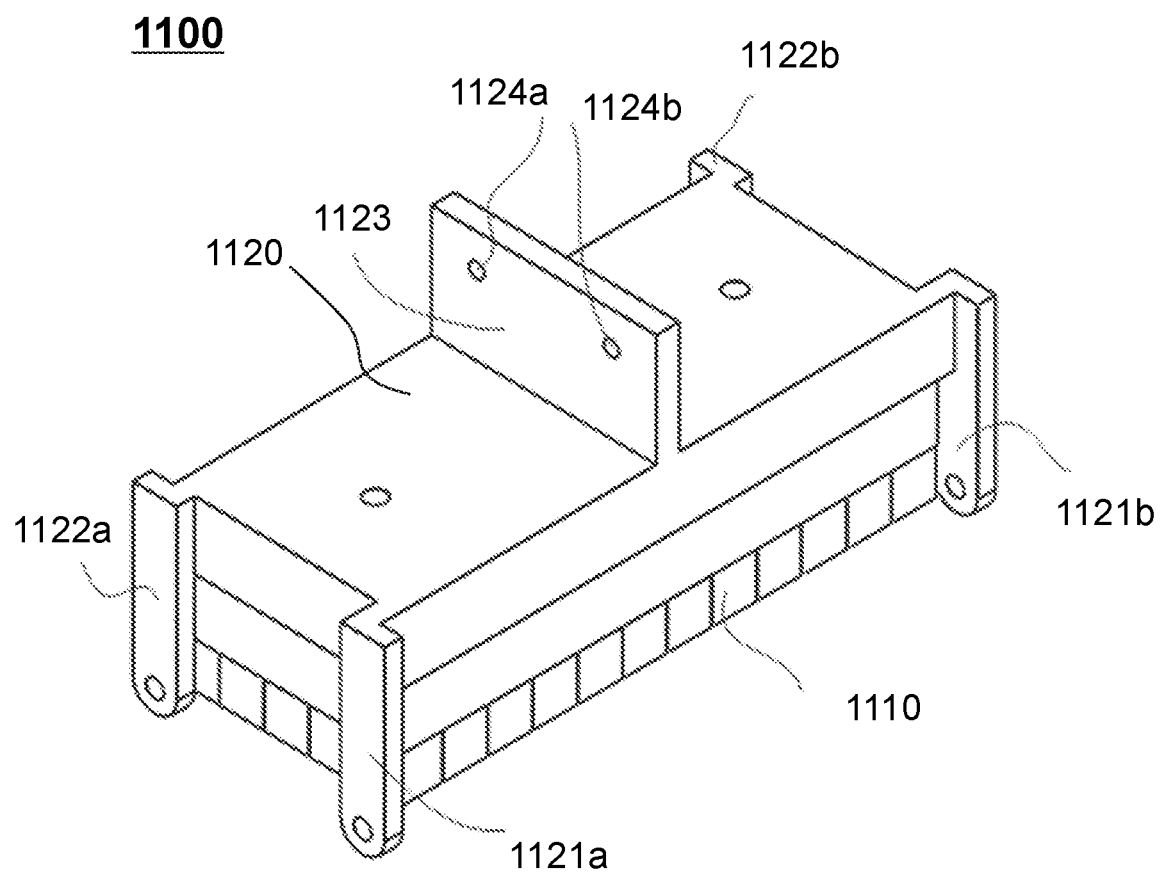
FIG. 11 illustrates an exemplary PET detector assembly according to some embodiments of the present disclosure.

FIG. 11 illustrates an exemplary PET detector assembly 1100 according to some embodiments of the present disclosure. The PET detector assembly 1100 may include a PET detector module 1110 and a chain piece 1120. The PET detector module 510 may detect incident gamma rays and generate one or more electrical signals (e.g., one or more electric pulses). The processing engine 130 may receive the electrical signals and determine a PET image based on the electrical signals. The PET detector module 1110 may be the PET detector module 310 in FIG. 3. The surface of the PET detector module 1110 away from the chain piece 1120 may be flat or curved. The chain piece 1120 may be configured to install the PET detector module 1110. The PET detector module 1110 may be installed on one side of the chain piece 1120 through different connection manners including, for example, gluing, welding, riveting, pressing, casting, pinning, buttoning, tying, sticking, clasping, plugging, screw connection, or the like, or any combination thereof.

Figure 12:
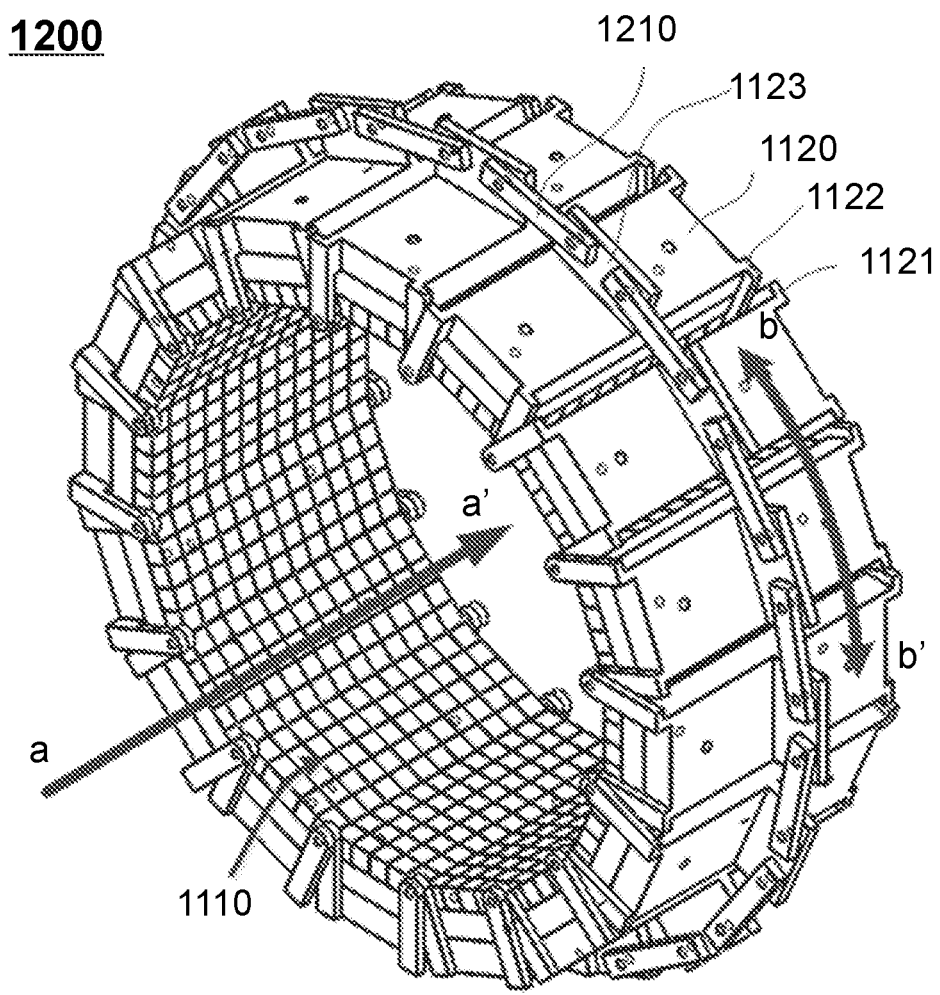
FIG. 12 illustrates an exemplary detector ring according to some embodiments of the present disclosure.

As shown in FIG. 11, the chain piece 1120 may include first hinge parts 1121a and 1121b (e.g., first hinge part 1121 as shown in FIG. 12), second hinge parts 1122a and 1122b (e.g., second hinge part 1122 as shown in FIG. 12), a stabilizing plate 1123, and fixing holes 1124a and 1124b formed on the stabilizing plate 1123. The length of the first hinge part 1121a (or the first hinge part 1121b) may be different or same with the length of the second hinge part 1122a (or the second hinge part 1122b).

FIG. 12 illustrates an exemplary detector ring 1200 according to some embodiments of the present disclosure. As shown in FIG. 11 and FIG. 12, the first hinge part 1121 and the second hinge part 1122 may be arranged along the circumferential direction b-b' of the detector ring 1200. The first hinge part 1121a and the first hinge part 1121b may be respectively configured at two end faces of the chain piece 1120 along the axial direction a-a' of the detector ring 1200. The second hinge part 1122a and the second hinge art 1122b may also be respectively configured at two end faces of the chain piece 1120 along the axial direction a-a' of the detector ring 1200. In some embodiments, the distance from the first hinge part 1121a to the first hinge part 1121b along the axial direction a-a' of the detector ring 1200 may be greater than the distance from the second hinge part 1122a to the second hinge part 1122b along the axial direction a-a' of the detector ring 1200. Two neighboring chain pieces 1120 (e.g. a first chain piece, and a second chain piece) of the detector ring 1200 may be connected by coupling the first hinge parts 1121 of one chain piece 1120 (e.g., the first chain piece) with the second hinge parts 1122 of the other chain piece 1120 (e.g., the second chain piece) by a rotation axis (not shown in FIG. 12). The rotation axis may be located at a position of the first hinge part 1121 and/or the second hinge part 1122 close to the center of the detector ring 1200. Along the axial direction a-a' of the detector ring 1200, the first hinge parts 1121 may be located outside of the second hinge parts 1122. In some embodiments, a connection part 1210 may be further adopted to connect the two neighboring chain pieces 1120. The connection part 1210 may connect the two stabilizing plates 1123 of the two neighboring chain pieces 1120 via the two fixing holes 1124. The shape of the stabilizing plate 1123 may be various, such as rectangular, trapezoid, triangle, circle, irregular shape, etc. Any shape capable of connecting the two neighboring chain pieces 1120 may be suitable in the present disclosure.

In some embodiments, the stabilizing plate 1123 may be optional. For example, the connection part 1210 may be directly connected with the chain piece 1120 on the side of the chain piece 1120 away from the PET detector module 1110. The connection part 1210 may be fixed with the chain piece 1120 through different connection manners including, for example, gluing, welding, riveting, pressing, casting, pinning, buttoning, tying, sticking, clasping, plugging, screw connection, or the like, or any combination thereof. Through the connection of the first hinge parts 1121, the second hinge parts 1122, and the connection part 1210, an adjacent angle between the two neighboring chain pieces 1120 of the detector ring 1200 along the circumferential direction b-b' of the detector ring 1200 may be determined. With a total arc angle of 360°, the number of chain pieces 1120 along the circumferential direction b-b' of the detector ring 1200 may be determined based on the adjacent angle. The adjacent angle may be adjusted based on different length of the connection part 1210. And then the number of chain pieces 1120 along the circumferential direction b-b' of the detector ring 1200 may be adjusted. For example, as shown in FIG. 12, sixteen chain pieces 1120 may be arranged along the circumferential direction b-b' of the detector ring 1200. In some embodiments, the number of the PET detector modules 1110 and the number of the chain pieces 1120 may not be one-to-one. For example, one PET detector module 1110 may be installed on more than one chain pieces 1120, or more than one PET detector modules 1110 may be installed on one chain piece 1120.

Figure 13:
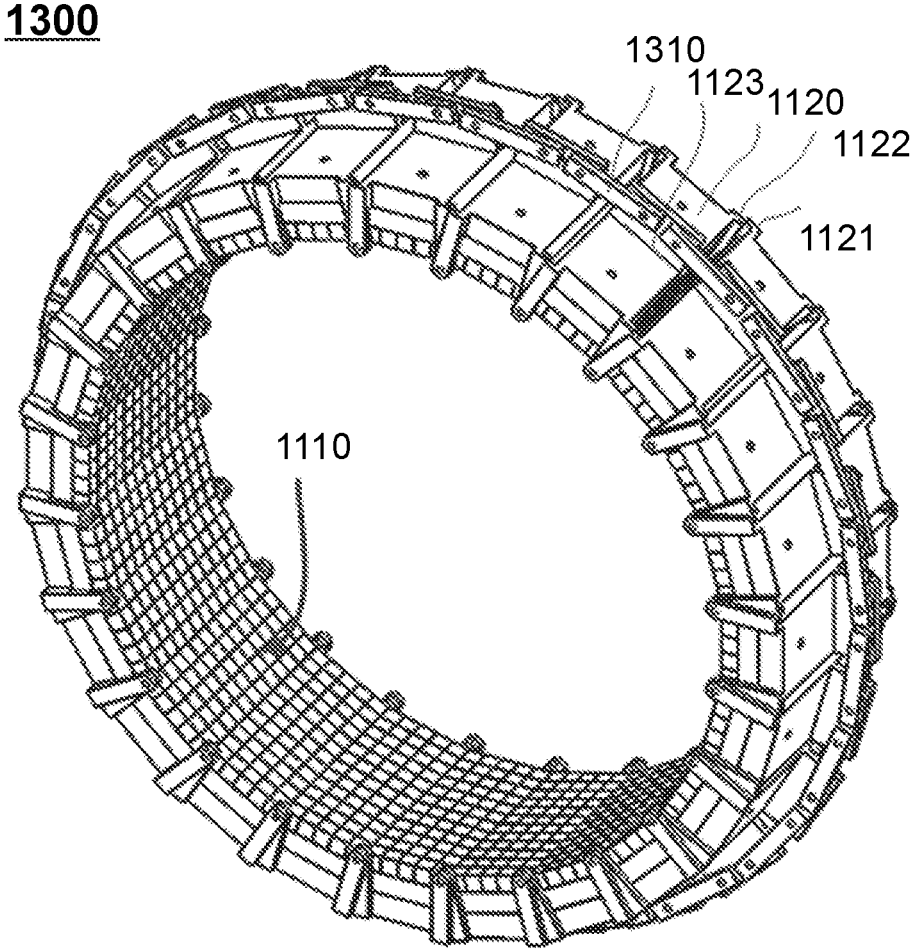
FIG. 13 illustrates an exemplary detector ring according to some embodiments of the present disclosure.

FIG. 13 illustrates an exemplary detector ring 1300 according to some embodiments of the present disclosure. The detector ring 1300 may include a connection part 1310. The length of the connection part 1310 may be lower than the length of the connection part 1210 shown in FIG. 12. The number of chain pieces 1120 around the detector ring 1300 may be, for example, twenty-four. The structure and connection manners of the detector ring 1300 may be similar to that of the detector ring 1200, and is not repeated here.

It should be noted that the description of the PET detector assembly 1100, the detector 1200, and the detector ring 1300 is intended to be illustrative, and not limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. For example, the detector ring 1200 and/or the detector ring 1300 may include more than one detector rings along the axial direction a-a' of the detector ring. Lengths of a plurality of connection parts 1210 arranged along the circumferential direction of the detector ring 1200 may be same or different. Similarly, lengths of a plurality of connection parts 1310 arranged along the circumferential direction of the detector ring 1300 may be same or different. As another example, lengths of a plurality of chain pieces 1120 of the detector ring 1200 and/or the detector ring 1300 along the axial direction a-a' of the detector ring may be same or different.

Figure 14:
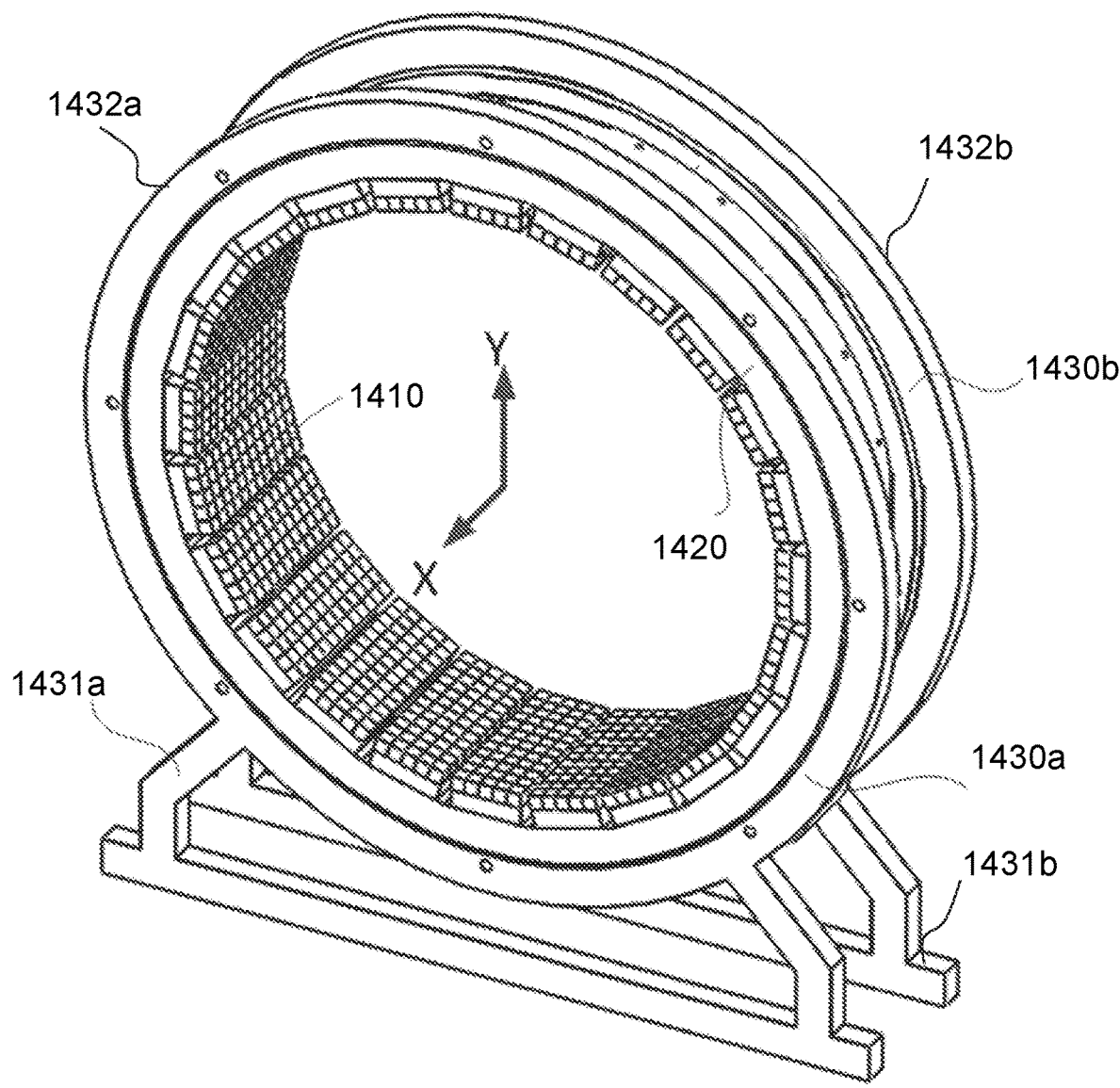
FIG. 14 illustrates an exemplary PET detector according to some embodiments of the present disclosure.

FIG. 14 illustrates an exemplary PET detector 1400 according to some embodiments of the present disclosure. The PET detector 1400 may include one or more detector modules 1410, a detector stabilizing cylinder 1420, and fixing supports 1430a and 1430b. Structures and/or components of the one or more detector modules 1410 may be found in FIG. 4 and its description. In some embodiments, the one or more detector modules 1410 may also be a plurality of PET detector assemblies (e.g., the PET detector assembly 500, the PET detector assembly 800, or the PET detector assembly 1100). In some embodiments, the one or more detector modules 1410 may be configured to form a detector ring (e.g., the detector ring 700, the detector ring 1000, the detector ring 1200, or the detector ring 1300). The one or more detector modules 1410 may be fixed with the detector stabilizing cylinder 1420 through different connection manners including, for example, gluing, welding, riveting, pressing, casting, pinning, buttoning, tying, sticking, clasping, plugging, screw connection, or the like, or any combination thereof. The detector stabilizing cylinder 1420 may be limited by the fixing supports 1430a and 1430b. In some embodiments, the fixing support 1430a may be also referred to as a front fixing support, and the fixing support 1430b may be also referred to as a rear fixing support. The fixing support 1430a may include a supporting foot 1431a and a supporting ring 1432a. The fixing support 1430b may include a supporting foot 1431b and a supporting ring 1432b. The detector stabilizing cylinder 1420 may be installed between the fixing support 1430a and the fixing support 1430b. Merely by way of example, the detector stabilizing cylinder 1420 may be installed between the supporting ring 1432a and the supporting ring 1432b. The detector stabilizing cylinder 1420 may be rotatably installed on the fixing support 1430a and the fixing support 1430b. The detector stabilizing cylinder 1420 may rotate along the circumferential direction of the detector stabilizing cylinder 1420. Inner diameters of the supporting ring 1432a and the supporting ring 1432b may be lower than the external diameter of the detector stabilizing cylinder 1420, and the detector stabilizing cylinder 1420 may be limited in the axial direction (the X-axis direction). Lubricants may be applied on contact surfaces between the detector stabilizing cylinder 1420 and the supporting rings 1432a and 1432b. The lubricants may reduce the resistance between the detector stabilizing cylinder 1420 and the supporting rings 1432a and 1432b when the detector stabilizing cylinder 1420 is rotating.

Figure 15:
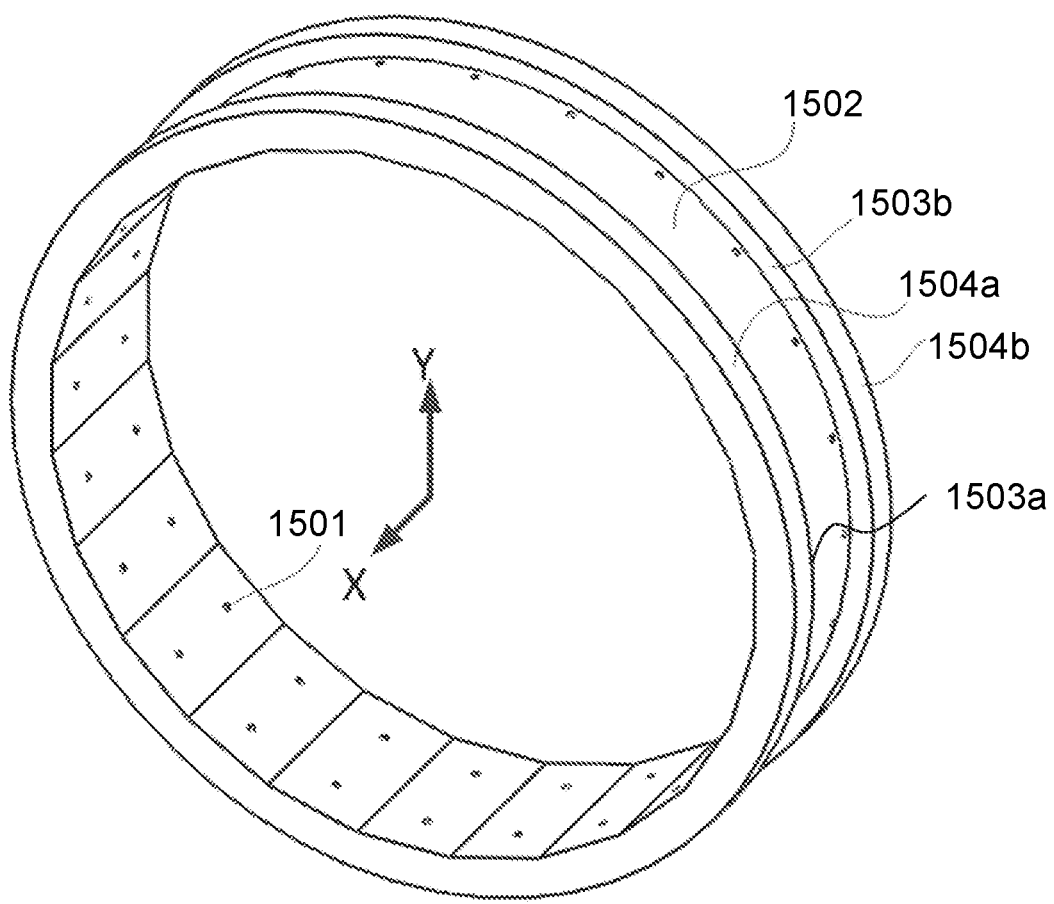
FIG. 15 illustrates an exemplary detector stabilizing cylinder according to some embodiments of the present disclosure.

FIG. 15 illustrates an exemplary detector stabilizing cylinder 1420 according to some embodiments of the present disclosure. The detector stabilizing cylinder 1420 may include a plurality of detector fixing holes 1501. The one or more detector modules 1410 may be fixed on the inner wall of the detector stabilizing cylinder 1420 through the plurality of detector fixing holes 1501. The detector stabilizing cylinder 1420 may also include a radial position-limiting surface 1502, axial position-limiting surfaces 1503a and 1503b, flanging structures 1504a and 1504b. In some embodiments, the detector stabilizing cylinder 1420 may not include the plurality of fixing holes 1501, and the one or more detector modules 1410 may be fixed with the inner wall of the detector stabilizing cylinder 1420 through other various manners, for example, gluing, pressing, etc.

In some embodiments, a drive part may be installed in contact with the radial position-limiting surface 1502 and/or the axial position-limiting surface 1503. The drive part may be configured to enable the detector stabilizing cylinder 1420 to rotate along the circumferential direction of the supporting ring 1432a and the supporting ring 1432b (as shown in FIG. 14). The drive part may directly or indirectly drive the detector stabilizing cylinder 1420 to rotate or drive the detector stabilizing cylinder 1420 to rotate under an external force (e.g., a drive motor). In some embodiments, the drive part may be a rolling wheel (as will be described in detail in connection with FIG. 16).

This description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments.

Figure 16:
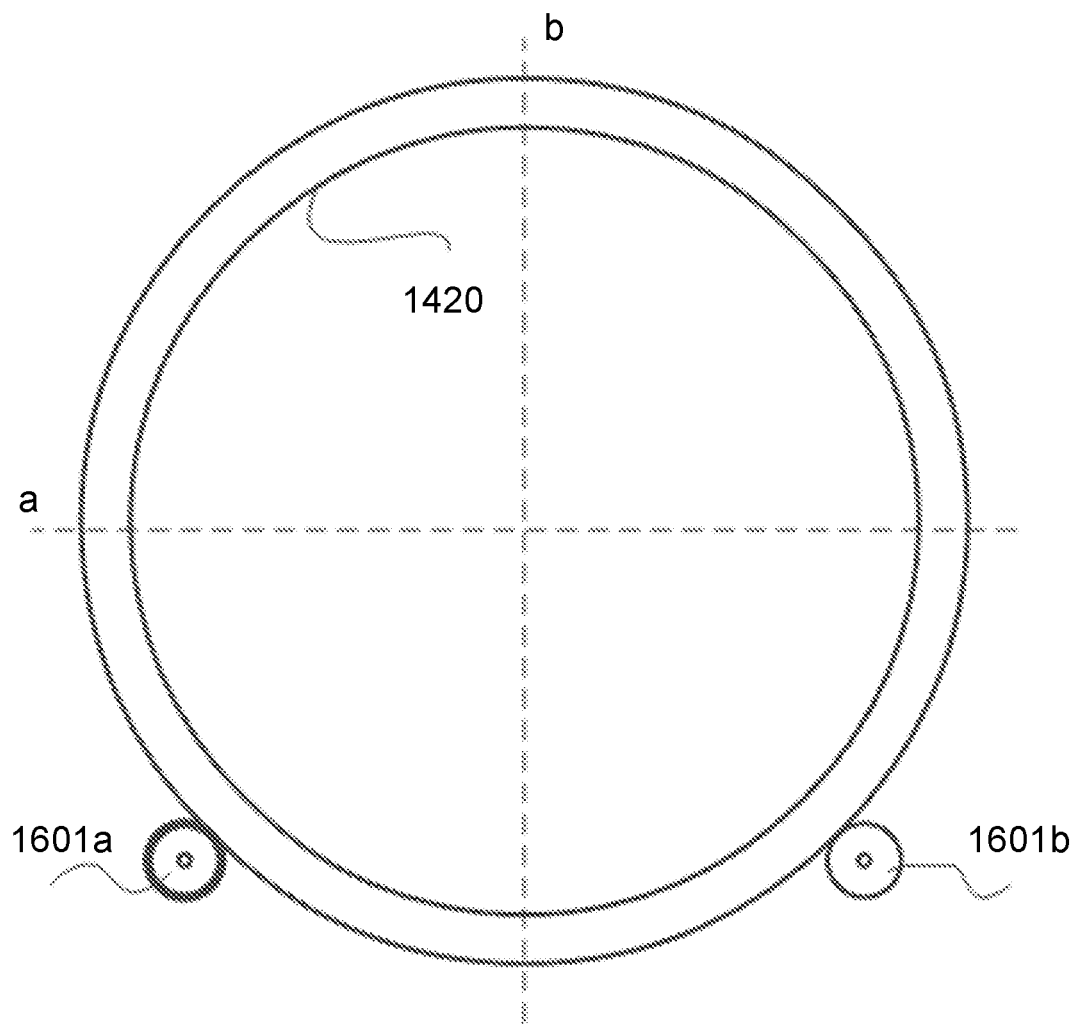
FIG. 16 illustrates the front view of an exemplary detector stabilizing cylinder according to some embodiments of the present disclosure.

FIG. 16 illustrates the front view of an exemplary detector stabilizing cylinder 1420 according to some embodiments of the present disclosure. Rolling wheels 1601a and 1601b may be installed in contact with the radial position-limiting surface 1502 (as shown in FIG. 15) of the detector stabilizing cylinder 1420. The rolling wheels 1601a and 1601b may be configured to limit the detector stabilizing cylinder 1420 in the radial direction (the Y-axis direction as shown in FIG. 15). The rolling wheels 1601a and 1601b may be referred to as radial position-limiting wheels 1601a and 1601b. A radial position-limiting wheel 1601 may limit the movement of the detector stabilizing cylinder 1420 in the radial direction (the Y-axis direction as shown in FIG. 15). The radial position-limiting wheels 1601a and 1601b may be located beneath the horizontal center line (marked as "a" in FIG. 16) of the detector stabilizing cylinder 1420. The radial position-limiting wheels 1601a and 1601b may be respectively located at both sides of the vertical center line (marked as "b" in FIG. 16) of the detector stabilizing cylinder 1420. At least two radial position-limiting wheels 1601 may be installed to limit the movement of the detector stabilizing cylinder 1420 in the radial direction (the Y-axis direction as shown in FIG. 15). The more the number of the radial position-limiting wheel 1601, the better stability of the detector stabilizing cylinder 1420.

In some embodiments, one of the radial position-limiting wheels 1601a and 1601b (e.g., the radial position-limiting wheels 1601a) may be a drive wheel that is connected with an external force (e.g., a drive motor (not shown in FIG. 16)). The drive wheel may drive the detector stabilizing cylinder 1420 to rotate along the circumferential direction under the power of the external force. In some embodiments, the radial position-limiting wheel 1601a and/or the radial position-limiting wheel 1601b itself may be a motive wheel that provides power for the rotation of the detector stabilizing cylinder 1420.

Figure 17:
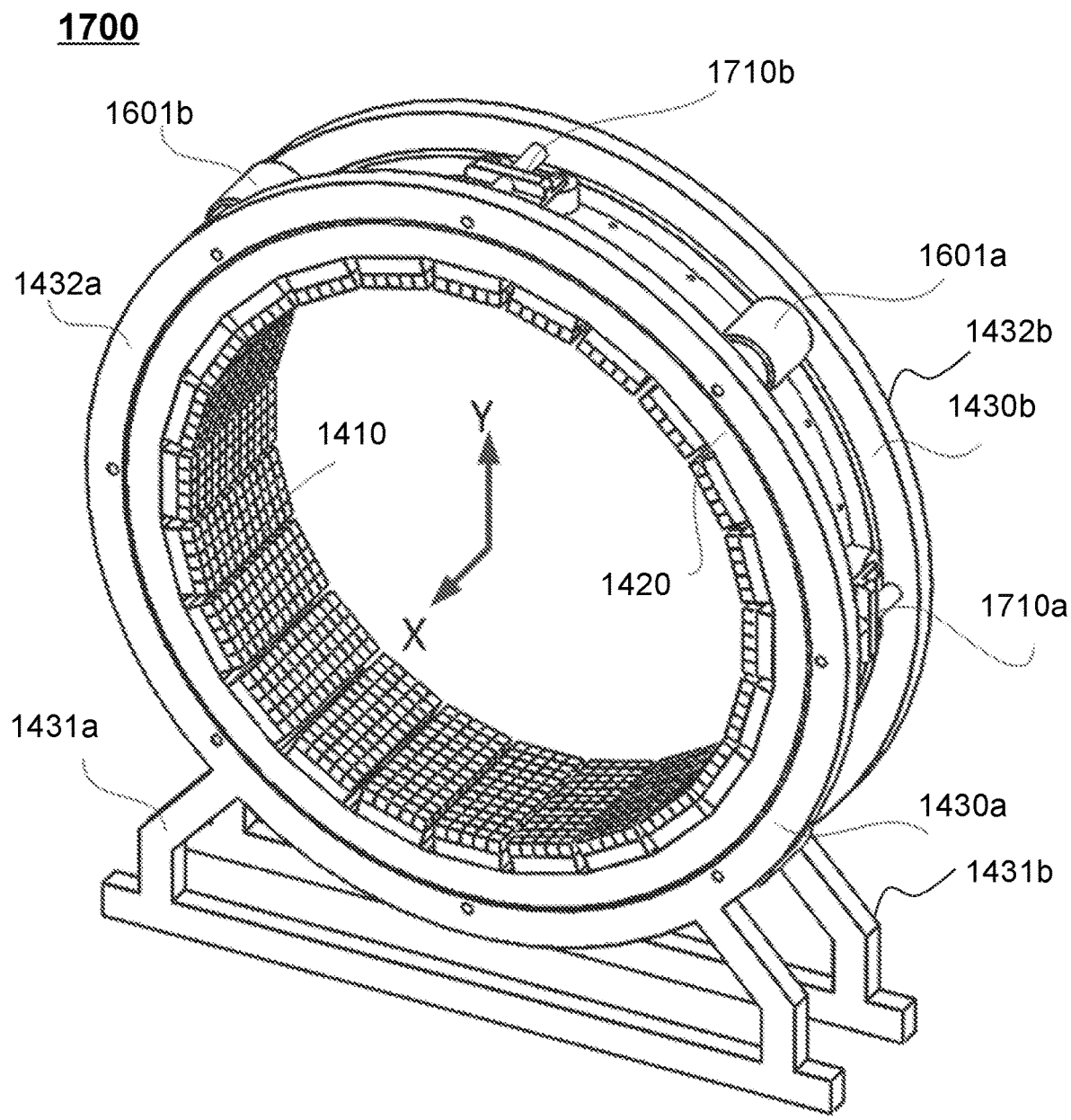
FIG. 17 illustrates an exemplary PET detector according to some embodiments of the present disclosure.

FIG. 17 illustrates an exemplary PET detector 1700 according to some embodiments of the present disclosure. The PET detector 1700 may include a plurality of axial position-limiting wheels (e.g., an axial position-limiting wheel 1710a, or an axial position-limiting wheel 1710b). The axial position-limiting wheel 1710a (or the axial position-limiting wheel 1710b) may be a rolling wheel configured to limit the movement of the detector stabilizing cylinder 1420 in the axial direction (shown as the X-axis direction in FIG. 17). The detector stabilizing cylinder 1420 may include axial position-limiting surfaces 1503a and 1503b (as shown in FIG. 15). The axial position-limiting wheel 1710a (or the axial position-limiting wheel 1710b) may be installed in contact with the axial position-limiting surfaces 1503a and 1503b of the detector stabilizing cylinder 1420. The detector stabilizing cylinder 1420 may rotate along the circumferential direction of the detector stabilizing cylinder 1420 under the limit of the plurality of axial position-limiting wheels and radial position-limiting wheels (e.g., a radial position-limiting wheel 1601a, or a radial position-limiting wheel 1601b).

In some embodiments, the axial position-limiting wheel 1710a and/or the axial position-limiting wheel 1710b may include a number of sub-rolling wheels. The sub-rolling wheels will be discussed in detail in connection with FIG. 19. In some embodiments, the PET detector 1700 may include at least three axial position-limiting wheels 1710a (or axial position-limiting wheels 1710b) and at least three radial position-limiting wheels 1601a (or radial position-limiting wheels 1601b). The at least three axial position-limiting wheels 1710a (or axial position-limiting wheels 1710b) and at least three radial position-limiting wheels 1601a (or radial position-limiting wheels 1601b) may be uniformly distributed along the circumferential direction of the detector stabilizing cylinder 1420. In some embodiments, the PET detector 1700 may include at least one axial position-limiting wheel 1701a (or axial position-limiting wheel 1701b) and at least two radial position-limiting wheels 1601a (or radial position-limiting wheels 1601b). The at least one axial position-limiting wheel 1701a (or axial position-limiting wheel 1701b) and at least two radial position-limiting wheels 1601a (or radial position-limiting wheels 1601b) may be uniformly distributed along the circumferential direction of the detector stabilizing cylinder 1420. The structure of the PET detector 1700 may be similar to that of the PET detector 1400, and is not repeated here.

Figure 18:
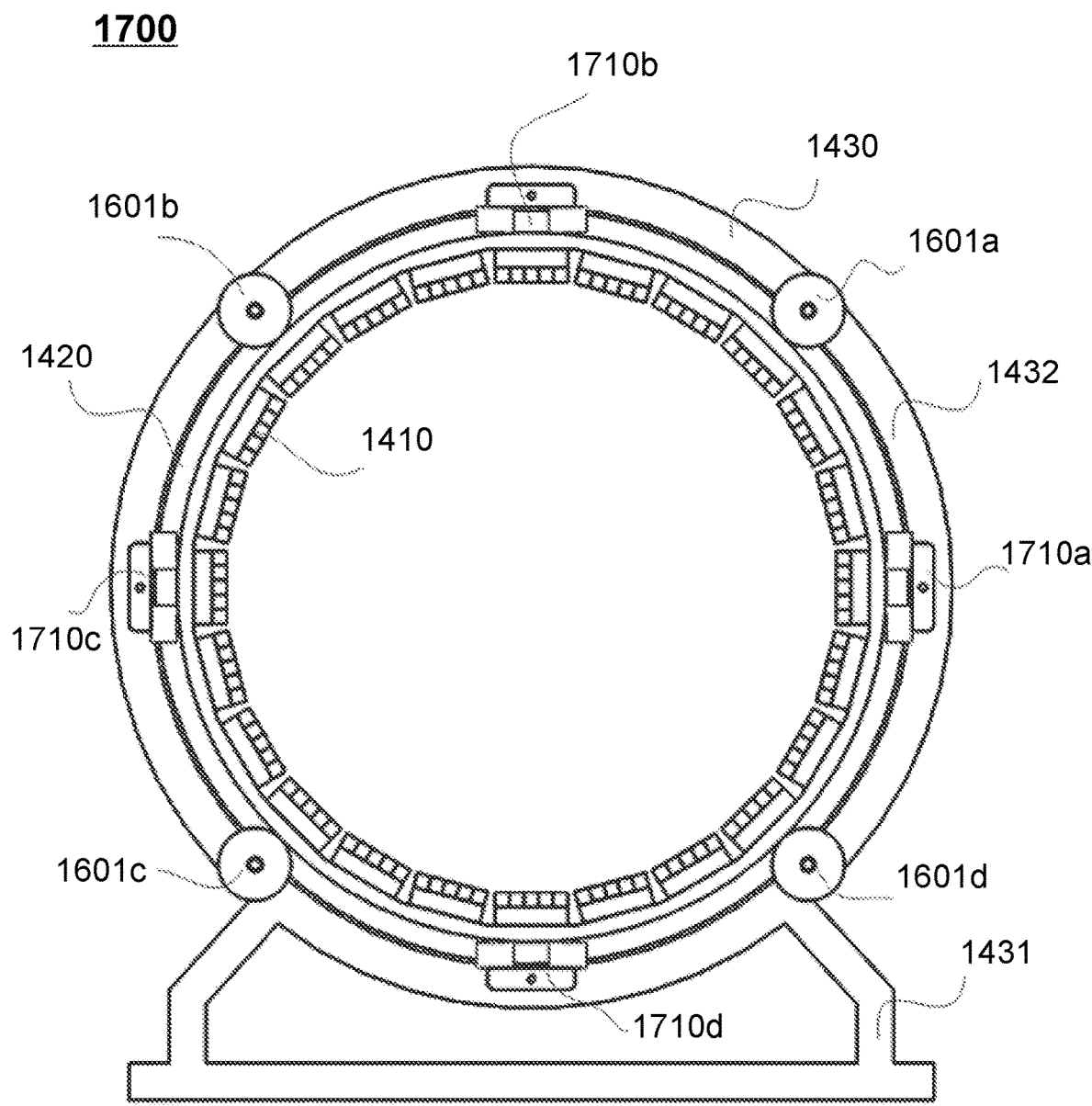
FIG. 18 illustrates the front view of an exemplary PET detector according to some embodiments of the present disclosure.

FIG. 18 illustrates the front view of an exemplary PET detector 1700 according to some embodiments of the present disclosure. As shown in FIG. 18, the PET detector 1700 may include four axial position-limiting wheels 1710a, 1710b, 1710c, and 1710d. The PET detector 1700 may also include four radial position-limiting wheels 1601a, 1601b, 1601c, and 1601d. The four axial position-limiting wheels and the four radial position-limiting wheels may be uniformly distributed along the circumferential direction of the detector stabilizing cylinder 1420. The axial position-limiting wheel 1710 and the radial position-limiting wheel 1601 may be alternately distributed along the circumferential direction of the detector stabilizing cylinder 1420.

In some embodiments, the movement of the detector stabilizing cylinder 1420 may be limited in the axial direction and the radial direction through one rolling wheel. The rolling wheels may not differentiate an axial position-limiting wheel or a radial position-limiting wheel. In some embodiments, the PET detector 1700 may include more than four axial position-limiting wheels and four radial position-limiting wheels. The more the number of the axial position-limiting wheel and the radial position-limiting wheel, the better rigidity of the PET detector 1700.

This description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments.

Figure 19:
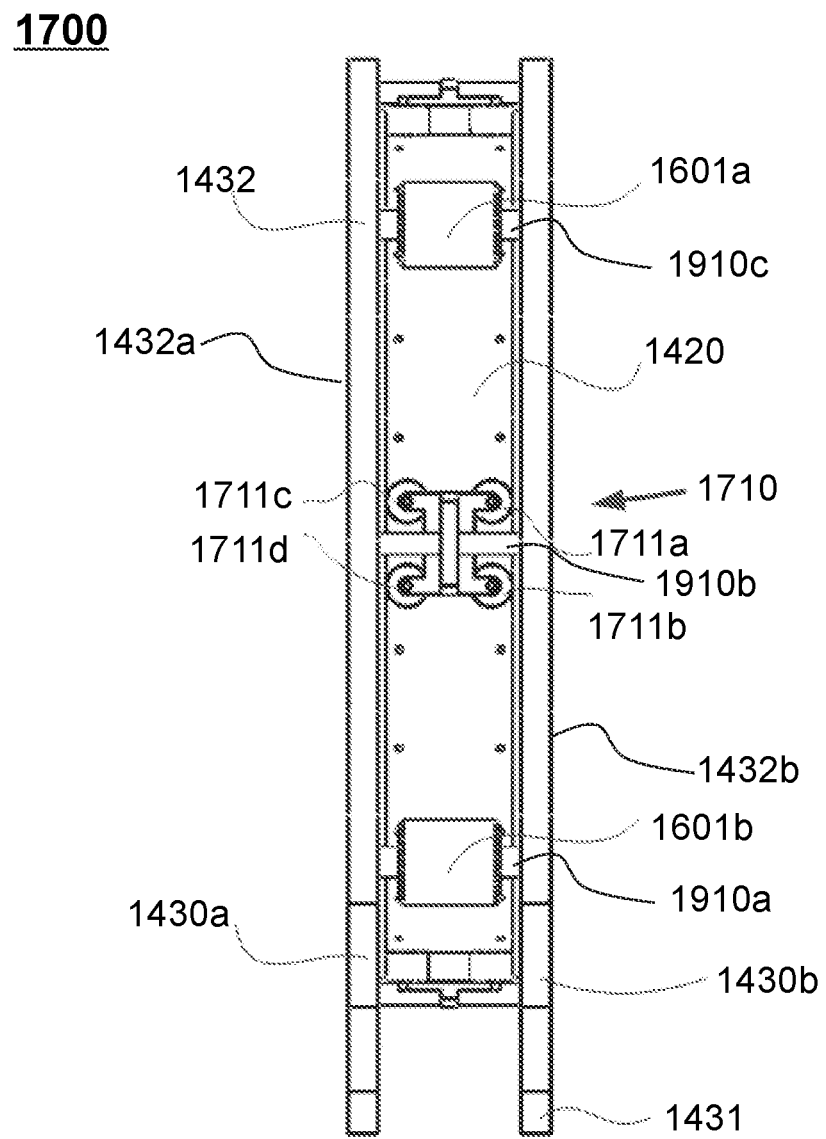
FIG. 19 illustrates the side view of an exemplary PET detector according to some embodiments of the present disclosure.

FIG. 19 illustrates the side view of an exemplary PET detector 1700 according to some embodiments of the present disclosure. As shown in FIG. 19, an axial position-limiting wheel 1710, a radial position-limiting wheel 1601a, and/or a radial position-limiting wheel 1601b may be fixed between a supporting ring 1432a and a supporting ring 1432b through a scrollable axis (e.g., a scrollable axis 1910a, a scrollable axis 1910b, or a scrollable axis 1910c). The axial position-limiting wheel 1710 may include four sub-rolling wheels 1711a, 1711b, 1711c, and 1711d. The four sub-rolling wheels 1711a, 1711b, 1711c, and 1711d may be installed in contact with the axial position-limiting surfaces 1503a and 1503b (as shown in FIG. 15) of the detector stabilizing cylinder 1420.

Figure 20:
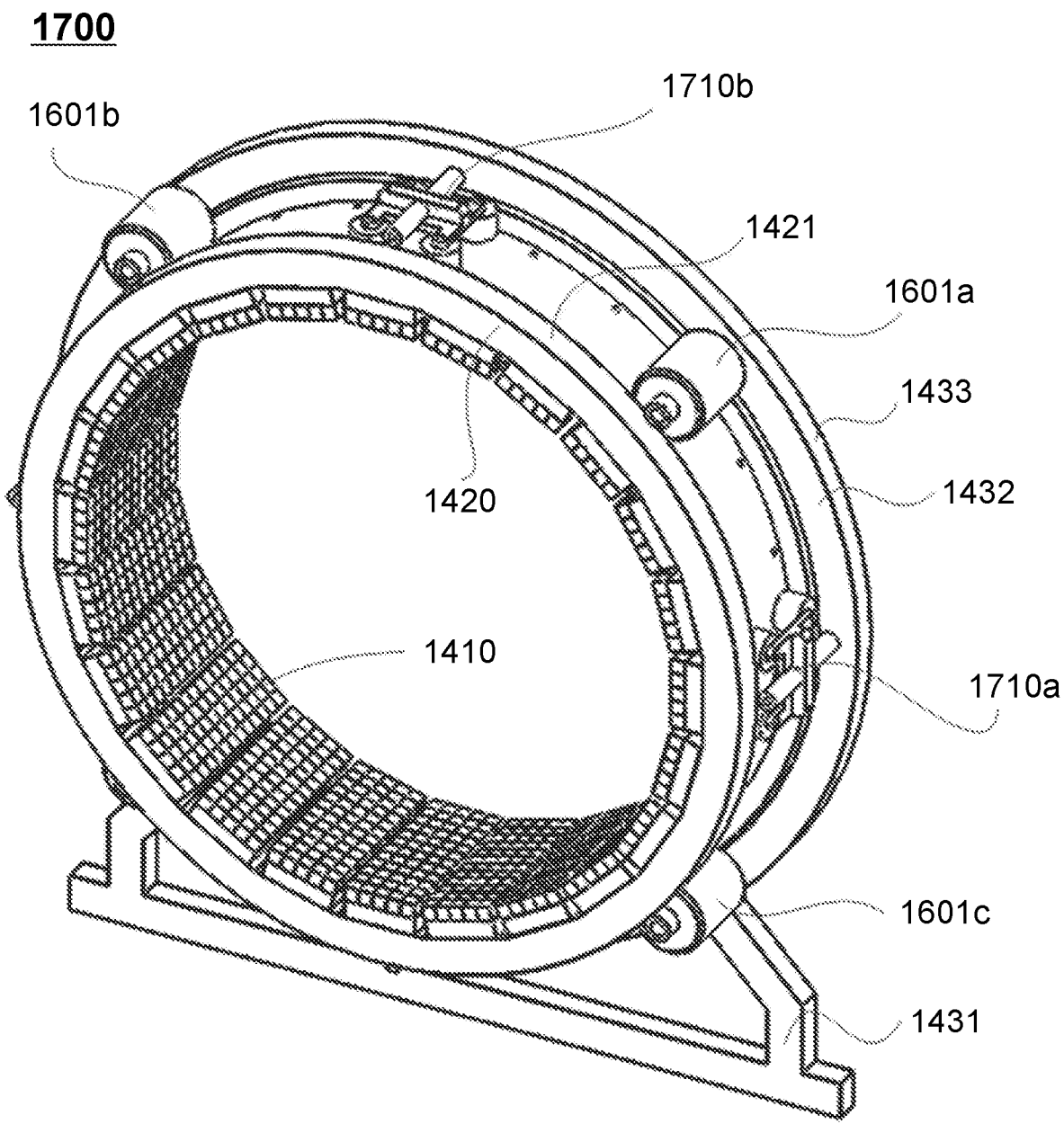
FIG. 20 illustrates an exemplary PET detector according to some embodiments of the present disclosure.

FIG. 20 illustrates an exemplary PET detector 1700 according to some embodiments of the present disclosure. The PET detector 1700 may include a brake part (not shown in FIG. 20). The brake part may be configured to brake or immobilize the detector stabilizing cylinder. In some embodiments, the brake part may be a screw, a rivet, a block, etc. For example, the screw may run through an outside surface 1433 of the supporting ring 1432 and an axial end face 1421 of the detector stabilizing cylinder 1420. By fixing the screw, the detector stabilizing cylinder 1420 may be braked or immobilized and may not rotate.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

We claim:

1. A PET frame, comprising:
    a detector stabilizing cylinder configured to stabilize one or more detector modules; and
    a fixing support configured to support the detector stabilizing cylinder, wherein the detector stabilizing cylinder is rotatably fixed on the fixing support through at least two rolling wheels that are located on both sides of a vertical center line of the detector stabilizing cylinder, respectively, and are beneath a horizontal center line of the detector stabilizing cylinder.

2. The PET frame of claim 1, wherein the fixing support includes a front fixing support and a rear fixing support, and the at least two rolling wheels are fixed between the front fixing support and the rear fixing support by a scrollable axis.

3. The PET frame of claim 1, wherein the at least two rolling wheels include:
    an axial position-limiting wheel configured to limit an axial position of the detector stabilizing cylinder; and a radial position-limiting wheel configured to limit a radial position of the detector stabilizing cylinder.

4. The PET frame of claim 1, wherein the at least two rolling wheels include at least one axial position-limiting wheel and at least two radial position-limiting wheels.

5. The PET frame of claim 4, wherein the at least one axial rolling wheel and the at least two radial position-limiting wheels are uniformly distributed along a circumferential direction of the detector stabilizing cylinder.

6. The PET frame of claim 1, wherein the at least two rolling wheels include four axial position-limiting wheels and four radial position-limiting wheels.

7. The PET frame of claim 2, wherein the front fixing support includes a first supporting foot and a first supporting ring, and the rear fixing support includes a second supporting foot and a second supporting ring.

8. The PET frame of claim 7, wherein the at least two rolling wheels are fixed between the first supporting ring and the second supporting ring.

9. The PET frame of claim 1, further comprising:
a plurality of installing modules configured to install the one or more detector modules, wherein
the plurality of installing modules are coupled together to form a detector ring,
at least one of the plurality of installing modules includes a chain piece,
the chain piece includes an installing groove on a surface connected to one of the one or more detector modules,
the one of the one or more detector modules includes a sliding part corresponding to the installing groove, and the sliding part is installed in the installing groove.

10. The PET frame of claim 9, wherein the plurality of installing modules include a first chain piece and a second chain piece, the first chain piece and the second chain piece being adjacent, wherein each of the first chain piece and the second chain piece includes:
a convex part at one end along a circumferential direction of the detector ring; and
a recessed part at the other end along the circumferential direction of the detector ring,
wherein the convex part of the first chain piece is coupled to the recessed part of the second chain piece via a rotation axis.

11. A PET detector, comprising: one or more detector modules and a PET frame, the PET frame including:
a detector stabilizing cylinder configured to stabilize the one or more detector modules; and
a fixing support configured to support the detector stabilizing cylinder, wherein the detector stabilizing cylinder is rotatably fixed on the fixing support through at least two rolling wheels that are located on both sides of a vertical center line of the detector stabilizing cylinder, respectively, and are beneath a horizontal center line of the detector stabilizing cylinder.

12. The PET detector of claim 11, wherein the fixing support includes a front fixing support and a rear fixing support, and the at least two rolling wheels are fixed between the front fixing support and the rear fixing support by a scrollable axis.

13. The PET detector of claim 11, wherein the at least two rolling wheels include:
an axial position-limiting wheel configured to limit an axial position of the detector stabilizing cylinder; and
a radial position-limiting wheel configured to limit a radial position of the detector stabilizing cylinder.

14. The PET detector of claim 11, wherein the at least two rolling wheels include at least one axial position-limiting wheel and at least two radial position-limiting wheels.

15. The PET detector of claim 14, wherein the at least one axial rolling wheel and the at least two radial position-limiting wheels are uniformly distributed along a circumferential direction of the detector stabilizing cylinder.

16. The PET detector of claim 11, wherein the at least two rolling wheels include four axial position-limiting wheels and four radial position-limiting wheels.

17. The PET detector of claim 11, wherein the front fixing support includes a first supporting foot and a first supporting ring, and the rear fixing support includes a second supporting foot and a second supporting ring.

18. The PET detector of claim 17, wherein the at least two rolling wheels are fixed between the first supporting ring and the second supporting ring.

19. The PET detector of claim 11, further comprising:
a plurality of installing modules configured to install the one or more detector modules, wherein
the plurality of installing modules are coupled together to form a detector ring,
at least one of the plurality of installing modules includes a chain piece,
the chain piece includes an installing groove on a surface connected to one of the one or more detector modules,
the one of the one or more detector modules includes a sliding part corresponding to the installing groove, and the sliding part is installed in the installing groove.

20. The PET detector of claim 19, wherein the plurality of installing modules include a first chain piece and a second chain piece, the first chain piece and the second chain piece being adjacent, wherein each of the first chain piece and the second chain piece includes:
a convex part at one end along a circumferential direction of the detector ring; and
a recessed part at the other end along the circumferential direction of the detector ring,
wherein the convex part of the first chain piece is coupled to the recessed part of the second chain piece via a rotation axis.

* * * * *